United States Patent
Wang

(10) Patent No.: US 10,372,246 B2
(45) Date of Patent: Aug. 6, 2019

(54) TRANSFERABLE NANOCOMPOSITES FOR TOUCH SENSORS

(71) Applicant: Hailiang Wang, Camarillo, CA (US)

(72) Inventor: Hailiang Wang, Camarillo, CA (US)

( * ) Notice: Subject to any disclaimer, the term of this patent is extended or adjusted under 35 U.S.C. 154(b) by 495 days.

(21) Appl. No.: 15/208,596

(22) Filed: Jul. 12, 2016

(65) Prior Publication Data

US 2017/0017317 A1 Jan. 19, 2017

Related U.S. Application Data

(63) Continuation-in-part of application No. 15/197,941, filed on Jun. 30, 2016.

(60) Provisional application No. 62/196,930, filed on Jul. 25, 2015, provisional application No. 62/193,218, filed on Jul. 16, 2015.

(51) Int. Cl.
| | |
|---|---|
| *B32B 3/02* | (2006.01) |
| *G06F 3/041* | (2006.01) |
| *C09D 5/24* | (2006.01) |
| *C09D 147/00* | (2006.01) |
| *C09D 137/00* | (2006.01) |

(52) U.S. Cl.
CPC .............. *G06F 3/041* (2013.01); *C09D 5/24* (2013.01); *C09D 137/00* (2013.01); *C09D 147/00* (2013.01); *G06F 2203/04103* (2013.01); *G06F 2203/04112* (2013.01)

(58) Field of Classification Search
CPC ........... G06F 3/041; G06F 2203/04112; G06F 2203/04103; C09D 5/24; C09D 137/00; C09D 147/00
See application file for complete search history.

(56) References Cited

U.S. PATENT DOCUMENTS

| | | |
|---|---|---|
| 7,173,778 B2 | 2/2007 | Naiyong et al. |
| 8,049,333 B2 | 11/2011 | Alden et al. |
| 8,247,468 B2 | 8/2012 | Yoneyama et al. |
| 8,564,314 B2 | 10/2013 | Shaikh et al. |
| 8,603,574 B2 | 12/2013 | Huang et al. |
| 8,704,112 B2 | 4/2014 | Choi et al. |
| 8,730,179 B2 | 5/2014 | Rosenblatt et al. |
| 8,766,127 B2 | 7/2014 | Chang et al. |

(Continued)

FOREIGN PATENT DOCUMENTS

EP 2275841 A2 1/2011

OTHER PUBLICATIONS

Poor, Alfred "How It Works: The Technology of Touch Screens" Computerworld, Oct. 17, 2012. Printed Mar. 8, 2014. Nine (9) printed pages. http://www.computerworld.com/s/article/9231961/How_it_works_The_technology_of_touch_screens?pageNumber=1.

(Continued)

*Primary Examiner* — Elizabeth E Mulvaney
(74) *Attorney, Agent, or Firm* — Fikret Kirkbir

(57) ABSTRACT

This disclosure generally relates to a transferable electrically conductive nanocomposite and a method for manufacturing it. This disclosure also relates to a high throughput process suitable for manufacturing of transparent electrically conductive nanocomposite layers formed on both flexible and rigid substrates. This disclosure also generally relates to an electronic system comprising a transparent conductive electrode. This disclosure also generally relates to an electronic system comprising a touch sensor and a method for manufacturing such system. This disclosure also generally relates to an optoelectronic system including a touch screen.

66 Claims, 24 Drawing Sheets

(56) References Cited

U.S. PATENT DOCUMENTS

| | | |
|---|---|---|
| 8,797,282 B2 | 8/2014 | Lyon et al. |
| 8,803,823 B2 | 8/2014 | Chang et al. |
| 9,207,824 B2 | 12/2015 | Wang |
| 2006/0257638 A1 | 11/2006 | Glatkowski et al. |
| 2008/0210660 A1 | 9/2008 | Stockum et al. |
| 2008/0286447 A1 | 11/2008 | Alden et al. |
| 2012/0141736 A1 | 6/2012 | Hotta et al. |
| 2012/0177920 A1 | 7/2012 | Huang |
| 2013/0088779 A1 | 4/2013 | Kang et al. |
| 2013/0095237 A1 | 4/2013 | Kalyankar et al. |
| 2013/0157008 A1 | 6/2013 | Aytug et al. |
| 2013/0164545 A1 | 6/2013 | Evans et al. |
| 2013/0230733 A1 | 9/2013 | Nakamura et al. |
| 2013/0250414 A1 | 9/2013 | Eguchi et al. |
| 2013/0286478 A1 | 10/2013 | Furui et al. |
| 2014/0009834 A1 | 1/2014 | Kalyankar |
| 2014/0021400 A1 | 1/2014 | Coenjarts |
| 2014/0023840 A1 | 1/2014 | Shibayama et al. |
| 2014/0030488 A1 | 1/2014 | Jung et al. |
| 2014/0038109 A1 | 2/2014 | Rahman et al. |
| 2014/0051804 A1 | 2/2014 | Xiaobing et al. |
| 2014/0338735 A1 | 11/2014 | Allemand et al. |
| 2015/0277616 A1 | 10/2015 | Wang |
| 2016/0041657 A1 | 2/2016 | Wang |

OTHER PUBLICATIONS

Walker, Geoff "Fundamentals of Touch Technologies" SID Display Week 2013, Oct. 2013, version 1.3. Printed Mar. 8, 2014. 247 pages. http://www.walkermobile.com/Touch_Technologies_Tutorial_Latest_Version.pdf.

Walker, Geoff "Fundamentals of Touch Technologies" SID Display Week 2014, Jun. 1, 2014, version 1.2. Printed Jun. 23, 2014. 315 pages. http://www.walkermobile.com/Touch_Technologies_Tutorial_Latest_Version.pdf.

Davis, Trevor "Reducing Capacitive Touchscreen Cost in Mobile Phones" Embedded, Feb. 25, 2013. Printed Mar. 14, 2014. Five(5) printed pages. http://staging.embedded.com/design/system-integration/4407698/Reducing-capacitive-touchscreen-cost-in-mobile-phones-.

Hong, Sukjoon "Selective Laser Direct Patterning of Silver Nanowire Percolation Network Transparent Conductor for Capacitive Touch Panel" J. Nanosci. Nanotechnol. 15, 2317-2323 (2015).

TRANSFERABLE NANOCOMPOSITES FOR TOUCH SENSORS

CROSS-REFERENCE TO RELATED APPLICATIONS

This application is based upon and claims priority to the U.S. provisional patent application No. 62/196,930, entitled "Transferable Nanocomposites for Touch Sensors," filed Jul. 25, 2015 . This application is also based upon and claims priority to the U.S. provisional patent application No. 62/193,218, entitled "Etching Compositions for Transparent Conductive Layers Comprising Silver Nanowires," filed Jul. 16, 2015,. This application is a continuation-in-part of U.S. patent application Ser. No. 15/197,941, entitled "Etching Compositions for Transparent Conductive Layers Comprising Silver Nanowires," filed Jun. 30, 2016,. The entire content of each of these patent applications is incorporated herein by reference.

BACKGROUND

Technical Field

This disclosure generally relates to a transferable electrically conductive nanocomposite and a method for manufacturing it. This disclosure also relates to a high throughput process suitable for manufacturing of transparent electrically conductive nanocomposite layers formed on flexible substrates and/or rigid substrates. This disclosure also generally relates to a system comprising a transparent conductive electrode. This disclosure also generally relates to an electronic system comprising a transparent conductive electrode. This disclosure also generally relates to an electronic system comprising a touch sensor and a method for manufacturing such system. This disclosure also generally relates to an optoelectronic system comprising a touch screen.

Description of Related Art

Since touch screens provide an easy interface for human-machine interactions, they recently have found a wide range of applications in consumer electronics, such as mobile phones, tablets, global positioning systems (GPS), medical devices, laptops, point-of-sale terminals, point-of-information kiosks, industrial control units, and visual display systems.

Although use of ITO as an electrically conductive material dominates the manufacturing of the touch screens, the search for new materials that can replace ITO has been significantly intensified in the past few years, motivated by scarce supply of raw materials used in preparation of ITO films and ever increasing demand of consumer electronics product. Particularly, ITO based transparent conducting film may not meet the requirement of new products where light weight and great readability are essential.

Among several different approaches for manufacturing of alternative transparent conducting electrodes, nanomaterial based transparent conducting electrodes including carbon nanotubes, graphene, and especially metal nanowires are investigated as leading candidates. However, a number of challenges still exist before such an approach can meet full manufacturing specifications including optical/electrical properties and mechanical and environment stability. Especially lack of an efficient manufacturing process with high throughput capacity is one important hurdle.

SUMMARY

This disclosure generally relates to a transferable electrically conductive nanocomposite and a method for manufacturing it. This disclosure also relates to a high throughput process suitable for manufacturing of transparent electrically conductive nanocomposite layers formed on flexible substrates and/or rigid substrates. This disclosure also generally relates to a system comprising a transparent (electrically) conductive electrode. This disclosure also generally relates to an electronic system comprising a transparent (electrically) conductive electrode. This disclosure also generally relates to an electronic system comprising a touch sensor and a method for manufacturing such system. This disclosure also generally relates to an optoelectronic system comprising a touch screen.

A transferable (electrically) conductive nanocomposite may comprise an electrically conductive nanocomposite layer; and a protective film. The electrically conductive nanocomposite layer, and the protective film each may have a front surface and a back surface. The front surface of the electrically conductive nanocomposite layer may face the back surface of the protective film. The electrically conductive nanocomposite layer may comprise an electrically conductive nanomaterial and a polymer.

The concentration of the electrically conductive nanomaterial at or around (e.g. at a region close to) the front surface of the electrically conductive nanocomposite layer may be higher than concentration of the electrically conductive nanomaterial at or around the back surface of the electrically conductive nanocomposite layer.

The transferable electrically conductive nanocomposite may further comprise a release film. The release film may have a front surface and a back surface. The back surface of the electrically conductive nanocomposite layer may face the release film. The release film may adhere to the back surface of the electrically conductive nanocomposite layer. Or the release film may be configured to adhere to the back surface of the electrically conductive nanocomposite layer. The protective film may adhere to the front surface of the electrically conductive nanocomposite layer. Or the protective film may be configured to adhere to the front surface of the electrically conductive nanocomposite layer.

The force of adhesion between the protective film and the front surface of the electrically conductive nanocomposite layer may be higher than force of adhesion between the release film and the back surface of the electrically conductive nanocomposite layer. The release film may adhere to the back surface of the electrically conductive nanocomposite layer. The protective film may adhere to the front surface of the electrically conductive nanocomposite layer. The adhesion force between the electrically conductive nanocomposite layer and the release film, and the adhesion force between the electrically conductive nanocomposite layer and the protective film may be controlled such that when the release film is peeled off from the back surface of the electrically conductive nanocomposite layer, the protective film may remain adhered to the front surface of the electrically conductive nanocomposite layer.

The electrically conductive nanomaterial may comprise a nanowire, a nanoribbon, a nanotube, a nanoparticle, or any combination thereof. The electrically conductive nanomaterial may comprise an electrically conductive material. The electrically conductive nanomaterial may comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof. The metal nanowire may comprise a silver nanowire.

The polymer of the electrically conductive nanocomposite layer may comprise a polyacrylate, a polymethacrylate, a polyurethane acrylate, a polyisocyanurate acrylate, a polyepoxide, or any combination thereof. The protective film may comprise poly(ethylene terephthalate) (PET), poly(methyl methacrylate) (PMMA), polycarbonate (PC), poly (ethylene naphthalate) (PEN), cellulose triacetate (TAC), polyimide (PI), or any combination thereof. The release film may comprise PET, PMMA, PC, PEN, TAC, PI, or any combination thereof.

A transparent conductive electrode may comprise a conductive nanocomposite layer; a lamination layer; and a transparent substrate. The conductive nanocomposite layer, the lamination layer, and the transparent substrate each may have a front surface and a back surface. The front surface of the lamination layer may face the back surface of the electrically conductive nanocomposite layer. The front surface of the transparent substrate may face the back surface of the lamination layer. The lamination layer may be between the conductive nanocomposite layer and the transparent substrate. The electrically conductive nanocomposite layer may comprise an electrically conductive nanomaterial and a polymer.

The transparent conductive electrode may further comprise a protective film. The protective film may have a front surface and a back surface. The back surface of the protective film may face the front surface of the electrically conductive nanocomposite layer. The protective film may comprise PET, PMMA, PC, PEN, TAC, PI, or any combination thereof. The transparent substrate may comprise PMMA, PC, a glass, or any combination thereof.

The lamination layer may comprise a polyacrylate, a polymethacrylate, a polyurethane acrylate, a polyisocyanurate acrylate, a polyepoxide, or any combination thereof.

The concentration of the electrically conductive nanomaterial at or around the front surface of the electrically conductive nanocomposite layer may be higher than concentration of the electrically conductive nanomaterial at or around the back surface of the electrically conductive nanocomposite layer.

The electrically conductive nanomaterial may comprise an electrically conductive material. The electrically conductive nanomaterial may comprise a nanowire, a nanoribbon, a nanotube, a nanoparticle, or any combination thereof. The electrically conductive nanomaterial may comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof. The metal nanowire may comprise a silver nanowire.

The polymer of the first electrically conductive nanocomposite layer may comprise a polyacrylate, a polymethacrylate, a polyurethane acrylate, a polyisocyanurate acrylate, a polyepoxide, or any combination thereof.

The transparent conductive electrode may further comprise a second lamination layer; and a second electrically conductive nanocomposite layer. The second lamination layer and the second electrically conductive nanocomposite layer each may have a front surface and a back surface. The front surface of the second lamination layer may face the back surface of the transparent substrate. The back surface of the second electrically conductive nanocomposite layer may face the back surface of the second lamination layer. The second lamination layer may be between the transparent substrate and the second conductive nanocomposite layer. The second electrically conductive nanocomposite layer may comprise an electrically conductive nanomaterial and a polymer.

The transparent conductive electrode may further comprise a first protective film. The first protective film may have a front surface and a back surface. The back surface of the first protective film may face the front surface of the second electrically conductive nanocomposite layer. The first protective film may comprise PET, PMMA, PC, PEN, TAC, PI, or any combination thereof.

The concentration of the electrically conductive nanomaterial layer at or around the front surface of the second electrically conductive nanocomposite layer may be higher than concentration of the electrically conductive nanomaterial at or around the back surface of the second electrically conductive nanocomposite layer.

The electrically conductive nanomaterial may comprise a nanowire, a nanoribbon, a nanotube, a nanoparticle, or any combination thereof. The electrically conductive nanomaterial may comprise an electrically conductive material. The electrically conductive nanomaterial may comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof. The metal nanowire may comprise a silver nanowire.

The polymer of the second electrically conductive nanocomposite layer may comprise a polyacrylate, a polymethacrylate, a polyurethane acrylate, a polyisocyanurate acrylate, a polyepoxide, or any combination thereof.

The transparent conductive electrode may further comprise a second protective film. The second protective film may have a front surface and a back surface. The back surface of the second protective film may face the front surface of the second electrically conductive nanocomposite layer. The second protective film may comprise PET, PMMA, PC, PEN, TAC, PI, or any combination thereof.

A system may comprise a cover lens; a first lamination layer; a first sensor layer; an optically clear adhesive layer; a transparent substrate; a second lamination layer; and a second sensor layer. The cover lens, the first lamination layer, the first sensor layer, the optically clear adhesive layer, the transparent substrate, the second lamination layer, and the second sensor layer each may have a front surface and a back surface. The first lamination layer may be between the cover lens and the first sensor layer. The optically clear adhesive layer may be between the first sensor layer and the transparent substrate. The second lamination layer may be between the transparent substrate and the second sensor layer. The cover lens may be formed on the front surface of the first lamination layer. The first lamination layer may be formed on the front surface of the first sensor layer. The first sensor layer may be formed on the front surface of the optically clear adhesive layer. The optically clear adhesive layer may be formed on the front surface of the transparent substrate. The transparent substrate may be formed on the front surface of the second lamination layer. The second lamination layer may be formed on the front surface of the second sensor layer.

The first sensor layer and the second sensor layer each may comprise a pattern such that the system can detect a touch. The first sensor layer and the second sensor layer each may comprise an electrically conductive nanomaterial and a polymer. The concentration of the electrically conductive nanomaterial at or around the front surface of the first sensor layer may be higher than concentration of the electrically conductive nanomaterial at or around the back surface of the first sensor layer. The concentration of the electrically conductive nanomaterial at or around the front surface of the second sensor layer may be higher than concentration of the electrically conductive nanomaterial at or around the back surface of the second sensor layer.

The electrically conductive nanomaterial may comprise an electrically conductive material. The electrically conductive nanomaterial may comprise a nanowire, a nanoribbon, a nanotube, a nanoparticle, or any combination thereof. The electrically conductive nanomaterial may comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof. The electrically conductive nanomaterial may comprise a silver nanowire.

The first sensor layer and/or the second layer each may comprise a polyacrylate, a polymethacrylate, a polyurethane acrylate, a polyisocyanurate acrylate, a polyepoxide, or any combination thereof.

The pattern of the electrically conductive nanocomposite layer may form a touch sensor.

The system may be a display system comprising the touch sensor. The display system may be a liquid crystal display, a light emitting display, a light emitting organic display, a plasma display, an electrochromic display, an electrophoretic display, an electrowetting display, an electrofluidic display, or any combination thereof.

A system may comprise a cover lens; an optically clear adhesive layer; a first sensor layer; a first lamination layer; a transparent substrate; a second lamination layer; and a second sensor layer. The cover lens, the optically clear adhesive layer, the first sensor layer, the first lamination layer, the transparent substrate, the second lamination layer, and the second sensor layer each may have a front surface and a back surface. The optically clear adhesive layer may be between the cover lens and the first sensor layer. The first lamination layer may be between the first sensor layer and the transparent substrate. The second lamination layer may be between the transparent substrate and the second sensor layer. The cover lens may be formed on the front surface of the optically clear adhesive layer. The optically clear adhesive layer may be formed on the front surface of the first sensor layer. The first sensor layer may be formed on the front surface of the first lamination layer. The first lamination layer may be formed on the front surface of the transparent substrate. The transparent substrate may be formed on the front surface of the second lamination layer. The second lamination layer may be formed on the front surface of the second sensor layer.

The first sensor layer and/or the second sensor layer each may comprise a pattern such that the system can detect a touch.

The first sensor layer and/or the second sensor layer each may comprise an electrically conductive nanomaterial and a polymer.

The electrically conductive nanomaterial at or around the front surface of the first sensor layer may be higher than concentration of the electrically conductive nanomaterial at or around the back surface of the first sensor layer. The concentration of the electrically conductive nanomaterial at or around the front surface of the second sensor layer may be higher than concentration of the electrically conductive nanomaterial at or around the back surface of the second sensor layer.

The electrically conductive nanomaterial may comprise a nanowire, a nanoribbon, a nanotube, a nanoparticle, or any combination thereof. The electrically conductive nanomaterial may comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof. The electrically conductive nanomaterial may comprise a silver nanowire.

The first sensor layer and/or the second layer each may comprise a polyacrylate, a polymethacrylate, a polyurethane acrylate, a polyisocyanurate acrylate, a polyepoxide, or any combination thereof.

The pattern of the electrically conductive nanocomposite layer may form a touch sensor.

The system may be a display system comprising the touch sensor. The display system may be a liquid crystal display, a light emitting display, a light emitting organic display, a plasma display, an electrochromic display, an electrophoretic display, an electrowetting display, an electrofluidic display, or any combination thereof.

A transparent conductive electrode may comprise a first conductive nanocomposite layer; a first lamination layer; a first coupling layer; and a transparent substrate. The first conductive nanocomposite layer, the first lamination layer, the first coupling layer, and the transparent substrate each may have a front surface and a back surface. The front surface of the first lamination layer may face the back surface of the first electrically conductive nanocomposite layer. The front surface of the first coupling layer may face the back surface of the first lamination layer. The front surface of the transparent substrate may face the back surface of the first coupling layer. The first lamination layer may be between the first conductive nanocomposite layer and the first coupling layer. The first coupling layer may be between the transparent substrate and the first lamination layer. The first electrically conductive nanocomposite layer may comprise an electrically conductive nanomaterial and a polymer.

The transparent conductive electrode may further comprise a first protective film. The first protective film may have a front surface and a back surface. The back surface of the first protective film may face the front surface of the first electrically conductive nanocomposite layer.

The first protective film may comprise PET, PMMA, PC, PEN, TAC, PI, or any combination thereof.

The transparent substrate may comprise PMMA, PC, a glass, or any combination thereof. The transparent substrate may comprise a glass.

The first lamination layer may comprise a polyacrylate, a polymethacrylate, a polyurethane acrylate, a polyisocyanurate acrylate, a polyepoxide, or any combination thereof.

The concentration of the electrically conductive nanomaterial at or around the front surface of the first electrically conductive nanocomposite layer may be higher than concentration of the electrically conductive nanomaterial at or around the back surface of the first electrically conductive nanocomposite layer.

The electrically conductive nanomaterial comprises a nanowire, a nanoribbon, a nanotube, a nanoparticle, or any combination thereof. The electrically conductive nanomaterial may comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof.

The first electrically conductive nanocomposite layer may comprise a polyacrylate, a polymethacrylate, a polyurethane acrylate, a polyisocyanurate acrylate, a polyepoxide, or any combination thereof.

The transparent conductive electrode may further comprise a second coupling layer; a second lamination layer; and a second electrically conductive nanocomposite layer. The second coupling layer, the second lamination layer, and the second electrically conductive nanocomposite layer each may has a front surface and a back surface. The front surface of the second coupling layer may face the back surface of the transparent substrate. The front surface of the second lamination layer may face the back surface of the second coupling layer. The back surface of the second electrically conductive nanocomposite layer may face the back surface of the second lamination layer. The second coupling layer may be between the transparent substrate and the second lamination layer. The second lamination layer may be between the second coupling layer and the second electrically conductive nanocomposite layer. The second electrically conductive nanocomposite layer may comprise an electrically conductive nanomaterial and a polymer.

The transparent conductive electrode may further comprise a first protective film. The first protective film may have a front surface and a back surface. The back surface of the first protective film may face the front surface of the first electrically conductive nanocomposite layer.

The first protective film may comprise PET, PMMA, PC, PEN, TAC, PI, or any combination thereof.

The concentration of the electrically conductive nanomaterial layer at or around the front surface of the second electrically conductive nanocomposite layer may be higher than concentration of the electrically conductive nanomaterial at or around the back surface of the second electrically conductive nanocomposite layer.

The electrically conductive nanomaterial may comprise a nanowire, a nanoribbon, a nanotube, a nanoparticle, or any combination thereof. The electrically conductive nanomaterial may comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof. The metal nanowire may comprise a silver nanowire.

The polymer of the second electrically conductive nanocomposite layer may comprise a polyacrylate, a polymethacrylate, a polyurethane acrylate, a polyisocyanurate acrylate, a polyepoxide, or any combination thereof.

The transparent conductive electrode may further comprise a second protective film. The second protective film may have a front surface and a back surface. The back surface of the second protective film may face the front surface of the second electrically conductive nanocomposite layer.

The second protective film may comprise PET, PMMA, PC, PEN, TAC, PI, or any combination thereof.

The first coupling layer may be formed by using a siloxane oligomer.

The siloxane oligomer may be prepared by hydrolysis of a trialkoxysilane. The trialkoxysilane may have a general chemical formula $F-R^1-Si(OR^2)_3$. F may be a UV or a thermally curable functional group comprising an acryloxy, a methacryloxy, or an epoxy group. $R^1$ may be $C_3$ to $C_{20}$ alkylene group. $R^2$ may be a $C_1$ to $C_5$ alkyl group. The trialkoxysilane may be methacryloxy propyltrimethoxysilane. The siloxane oligomer may have an average molecular weight in the range of 100 to 20,000. The siloxane oligomer may have an average molecular weight in the range of 500 to 1,000.

The first coupling layer and the second coupling layer may be formed by using a siloxane oligomer.

The siloxane oligomer may be prepared by hydrolysis of a trialkoxysilane. Trialkoxysilane may have a general chemical formula $F-R^1-Si(OR^2)_3$. F may be a UV or a thermally curable functional group comprising an acryloxy, a methacryloxy, or an epoxy group. $R^1$ may be $C_3$ to $C_{20}$ alkylene group. $R^2$ may be a $C_1$ to $C_5$ alkyl group. The trialkoxysilane may be methacryloxy propyltrimethoxysilane. The siloxane oligomer may have an average molecular weight in the range of 100 to 20,000. The siloxane oligomer may have an average molecular weight in the range of 500 to 1,000.

Any combination of above features, systems, devices, and methods are within the scope of this disclosure.

These, as well as other components, steps, features, objects, benefits, and advantages will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

In this disclosure, the following reference numbers are used for the features disclosed: transferable electrically conductive nanocomposite 100, electrically conductive nanocomposite layer 101, front surface of the electrically conductive nanocomposite layer 101.1, back surface of the electrically conductive nanocomposite layer 101.2, first electrically conductive nanocomposite layer 101.3, second electrically conductive nanocomposite layer 101.4, protective film 102, first protective film 102.1, second protective film 102.2, release film 103, liquid nanomaterial dispersion layer 104, dried nanomaterial layer 105, first component 106, conductive nanomaterial and liquid monomer mixing layer 107, second component 108, third component 109, transparent substrate 110, cover lens 111, liquid lamination formulation layer 112, (solid) lamination layer 113, first (solid) lamination layer 113.1, second (solid) lamination layer 113.2, electrically conductive nanomaterial 114, fourth component 115, fifth component 116, reaction mixture 117, siloxane oligomer 118, first sensor layer 119, sixth component 120, second sensor layer 121, seventh component 122, optically clear adhesive layer 123, glass surface modifier 124, siloxane coupling layer 125, eighth component 126, ninth component 127, tenth component 128, eleventh component 129, twelfth component 130, thirteenth component 131, touch sensor 200, front surface of the touch sensor 200.1, back surface of the touch sensor 200.2, single-sided transparent conductive electrode 310, double-sided transparent conductive electrode 320, deposition process 1A, heating process 1B, wet coating process 1C, layering process 1D, UV curing process 1E, peel-off process 2A, deposition process 2B, layering process 2C, thermal curing or UV curing process 2D, peel-off process 2E, chemical reaction process 3A, solvent addition process 3B, deposition process 3C, thermal treatment process 3D, patterning process 4A, patterning process 4B, layering process 4C, patterning process 5A, lamination process 5B, and layering process 5C.

DETAILED DESCRIPTION OF ILLUSTRATIVE EMBODIMENTS

Figure 1:
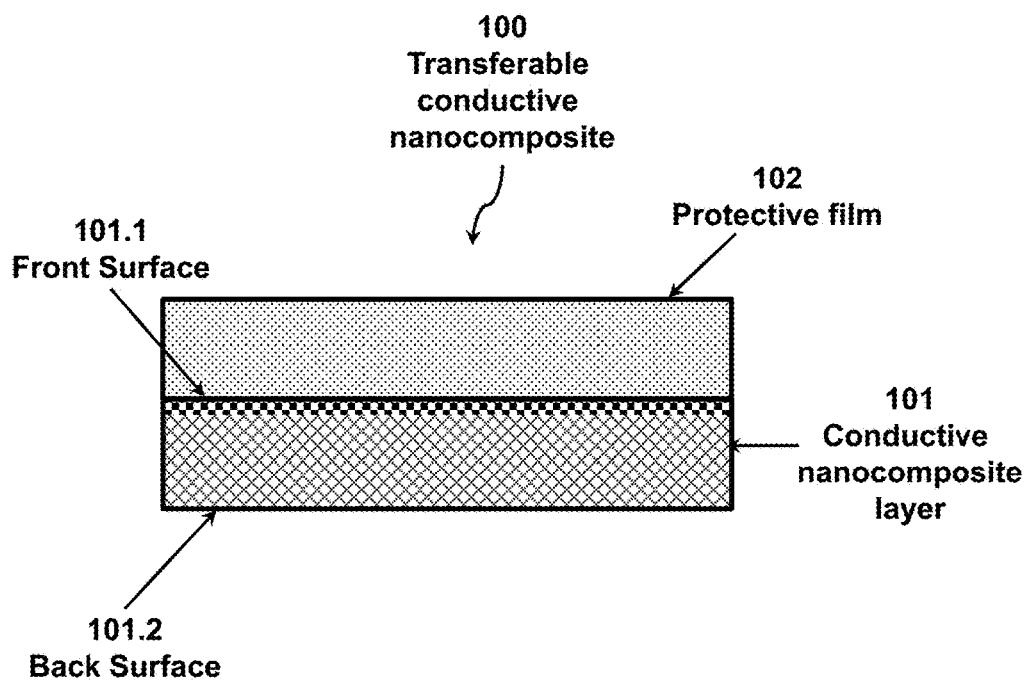
FIG. 1 is a drawing of an exemplary transferable electrically conductive nanocomposite comprising an electrically conductive nanocomposite layer and a protective film. Features shown in this cross-sectional view of the system are not drawn to scale.

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

In this disclosure, the word "form" may mean "deposit," "coat," "dispose," "laminate," "apply," "place," "provide," "position," "manufacture," or the like. In this disclosure, the phrase "any combination thereof" or "a combination thereof" may mean "any mixture thereof," "any composite thereof," "any alloy thereof," or the like. In this disclosure, the indefinite article "a" and phrases "one or more" and "at least one" are synonymous and mean "at least one."

The present disclosure relates to a U.S. Patent to Hailiang Wang, entitled "Systems and Methods for Touch Sensors on Polymer Lenses" U.S. Pat. No. 9,207,824; filed Mar. 25, 2014. The present disclosure also relates to a U.S. Patent Application to Hailiang Wang, entitled "Systems and High Throughput Methods for Touch Sensors" U.S. patent application Ser. No. 14/667,688; filed Mar. 25, 2015. The present disclosure also relates to a U.S. Provisional Patent Application to Hailiang Wang, entitled "Etching Compositions for Transparent Conductive Layers Comprising Silver Nanowires" U.S. Patent Application No. 62/193,218; filed Jul. 16, 2015. The entire content of each of these patent applications is incorporated herein by reference.

This disclosure generally relates to a transferable electrically conductive nanocomposite and a method for manufacturing it. This disclosure also relates to a high throughput process suitable for manufacturing of transparent electrically conductive nanocomposite layers formed on flexible substrates and/or rigid substrates. This disclosure also generally relates to a system comprising a transparent conductive electrode. This disclosure also generally relates to an electronic system comprising a transparent conductive electrode. This disclosure also generally relates to an electronic system comprising a touch sensor and a method for manufacturing such system. This disclosure also generally relates to an optoelectronic system comprising a touch screen.

The present disclosure is related to a transferable electrically conductive nanocomposite and a method for manufacturing it.

The present disclosure also relates to a high throughput method suitable for manufacturing of transparent electrically conductive nanocomposite layers formed on either flexible or rigid (i.e. non-flexible) substrates. Examples of rigid substrates may be thick PMMA sheets, thick PC sheets, and particularly glass sheets. The glass may comprise any type of glass.

The present disclosure also generally relates to a transparent conductive electrode and a method for manufacturing it.

The present disclosure provides touch sensors with high optical transmittance and low electrical resistance. This disclosure further provides high throughput methods that use transferable electrically conductive nanocomposites for manufacturing of such touch sensors. Better touch sensors with improved optical and electrical properties at a lower price may thereby be obtained.

The present disclosure also generally relates to an electronic system comprising a touch sensor and a method for manufacturing such system. This disclosure also generally relates to an optoelectronic system comprising a touch screen.

The present disclosure also generally relates to optoelectronic systems including touch screens and displays, particularly to systems such as liquid-crystal displays (LCD), light emitting displays (LED), organic light emitting displays (OLED), polymer light emitting displays (PLED), plasma displays, electrochromic displays, and the like, which may comprise the touch sensors and/or the transferable electrically conductive nanocomposites. The electronic system of current disclosure also relates to electrophoretic displays, electrowetting displays, electrofluidic displays and other bistable displays such as those incorporated into e-paper, Kindle readers, and the like, which may comprise the touch sensors made by the transferable electrically conductive nanocomposites.

Figure 2:
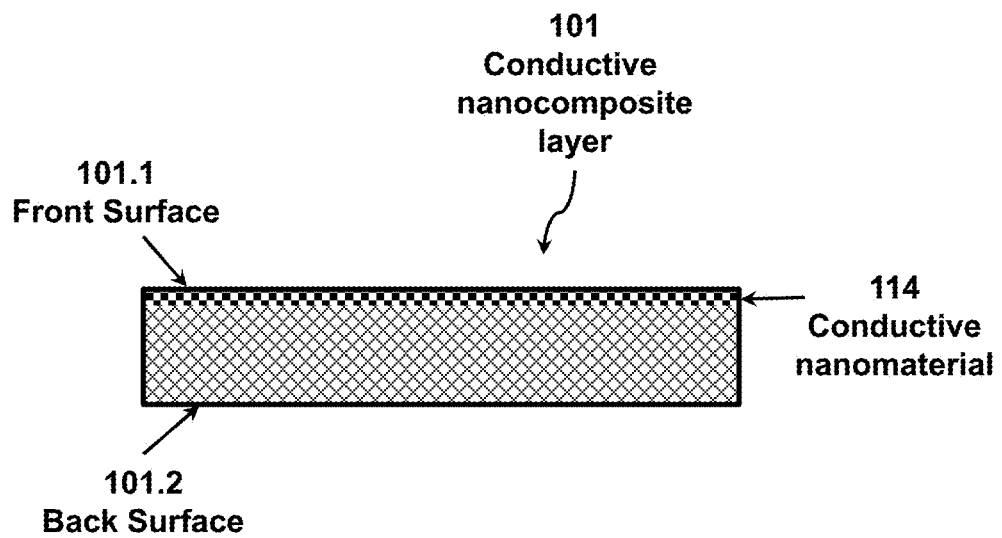
FIG. 2 is a drawing of an exemplary electrically conductive nanocomposite layer.
Figure 3:
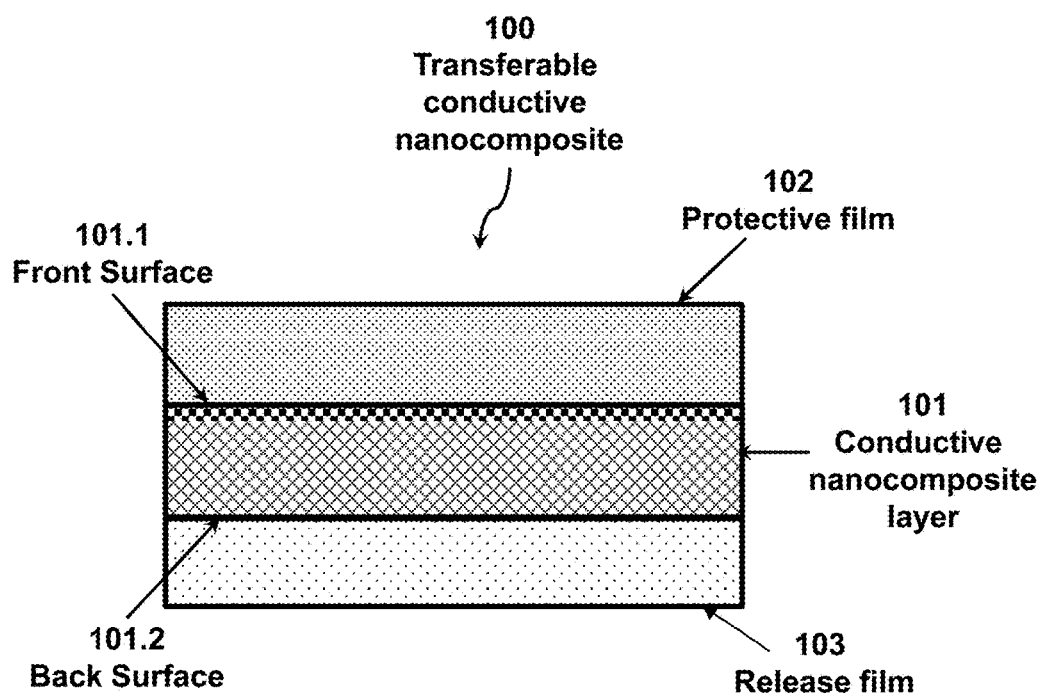
FIG. 3 is a drawing of an exemplary transferable electrically conductive nanocomposite comprising an electrically conductive nanocomposite layer, a protective film, and a release film. Features shown in this cross-sectional view of the system are not drawn to scale.
Figure 6:
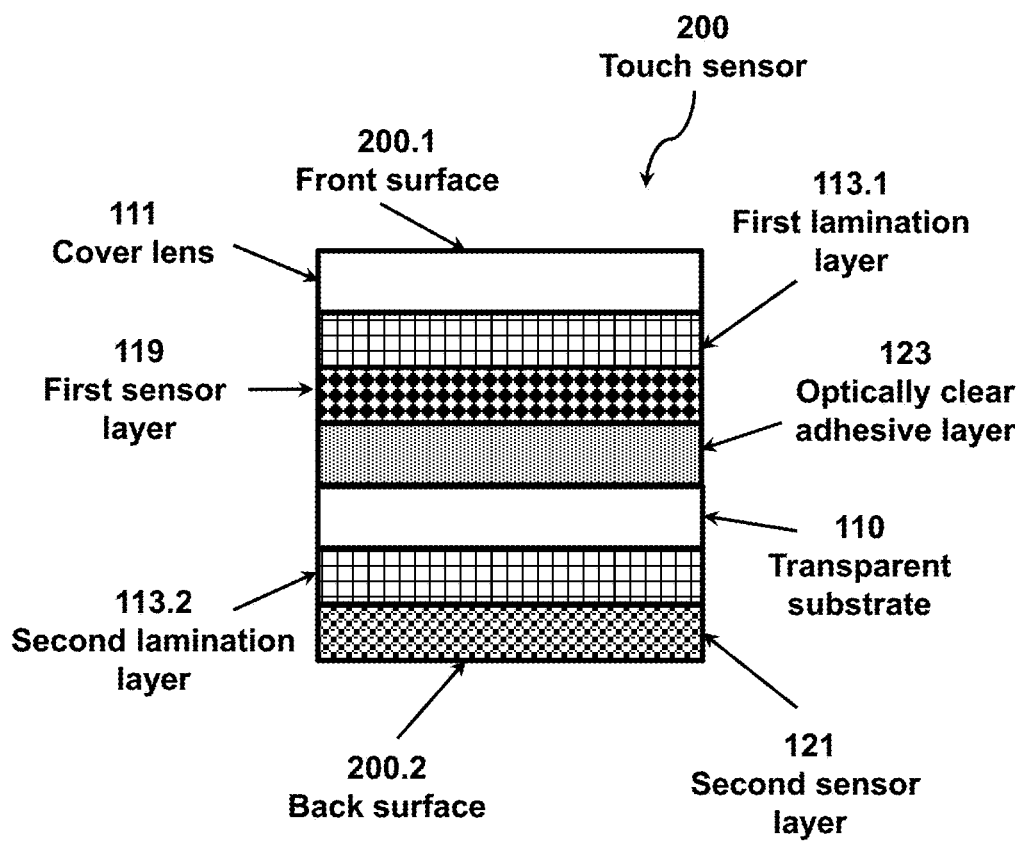
FIG. 6 is a drawing of an exemplary system comprising a touch sensor. The touch sensor comprises a cover lens, a first lamination layer, a first sensor layer, an optically clear adhesive layer, a transparent substrate, a second lamination layer, and a second sensor layer. Features shown in this cross-sectional view of the system are not drawn to scale.
Figure 7:
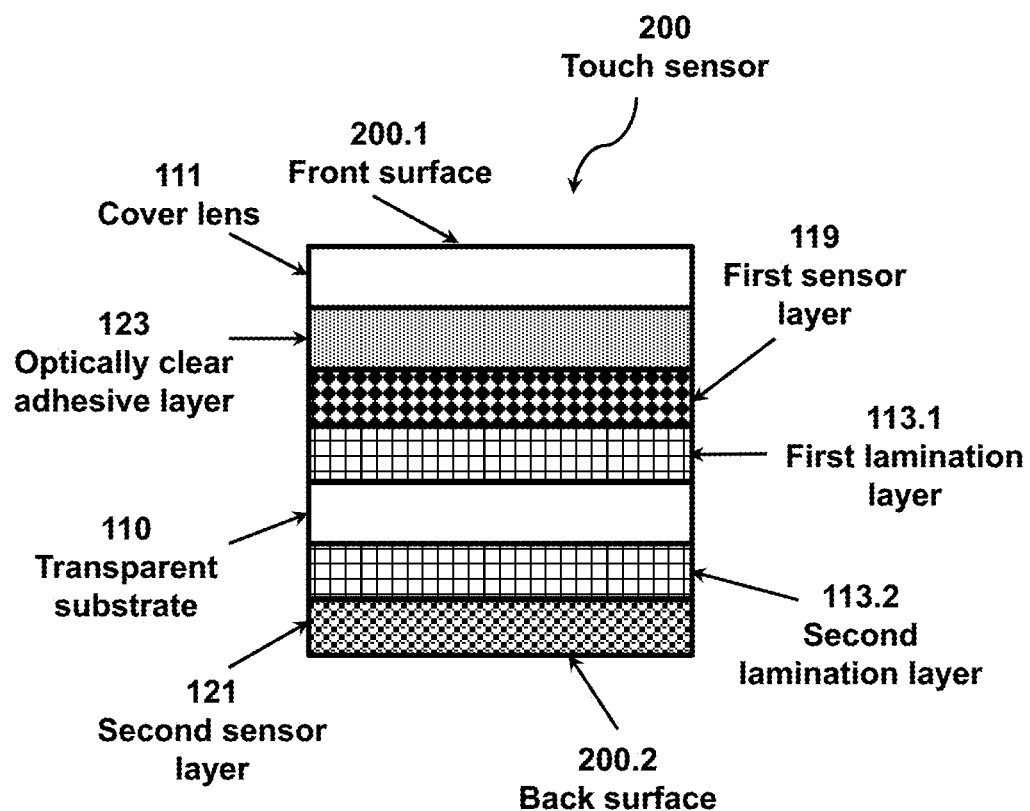
FIG. 7 is a drawing of an exemplary system comprising a touch sensor. The touch sensor comprises a cover lens, an optically clear adhesive layer, a first sensor layer, a first lamination layer, a transparent substrate, a second lamination layer, and a second sensor layer. Features shown in this cross-sectional view of said system are not drawn to scale.

The present disclosure generally relates to a transferable electrically conductive nanocomposite 100. Examples of such transferable electrically conductive nanocomposites 100 are shown in FIGS. 1-3. These transferable electrically conductive nanocomposites may be used in manufacturing of transparent conductive electrodes. Examples of the transparent conductive electrodes are shown in FIGS. 4 5, 21 and 24. The transparent conductive electrodes may be used in manufacturing of touch sensors. Examples of the touch sensors are shown in FIGS. 6 and 7. Manufacturing methods of such transferable electrically conductive nanocomposites, transparent conductive electrodes, and touch sensors are shown in FIGS. 8-10, 17-21, and 23-24.

In one example, as shown in FIG. 1, the transferable electrically conductive nanocomposite 100 may comprise an electrically conductive nanocomposite layer 101 and a protective film 102. The electrically conductive nanocomposite layer 101 may have a front surface 101.1 and a back surface 101.2. In this example, the protective film is formed on the front surface of the electrically conductive nanocomposite layer.

The electrically conductive nanocomposite layer 101 may comprise an electrically conductive nanomaterial and a polymer matrix. The electrically conductive nanomaterial may comprise a nanowire, a nanoribbon, a nanotube, a nanoparticle, or any combination thereof. For example, the electrically conductive nanomaterial may comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof. The polymer matrix of the electrically conductive nanocomposite layer may comprise a polyacrylate, a polymethacrylate, a polyurethane acrylate, a polyisocyanurate acrylate, a polyepoxide, or any combination thereof.

In one example, the electrically conductive nanocomposite layer 101 may comprise a silver nanowire in a polyacrylate matrix. In another example, the electrically conductive nanocomposite layer 101 may comprise a silver nanowire in a polymethacrylate matrix. Yet, in another example, the electrically conductive nanocomposite layer 101 may comprise a silver nanowire in a polyurethane acrylate matrix. Yet in another example, the electrically conductive nanocomposite layer 101 may comprise a silver nanowire in a polyacrylate/polyurethane mixture matrix.

Thickness of the electrically conductive nanocomposite layer 101 may be in the range of 0.05 micrometer to 10 micrometers; or in the range of 0.05 micrometer to 5 micrometers; or in the range of 0.05 micrometer to 1 micrometer.

Figure 17:
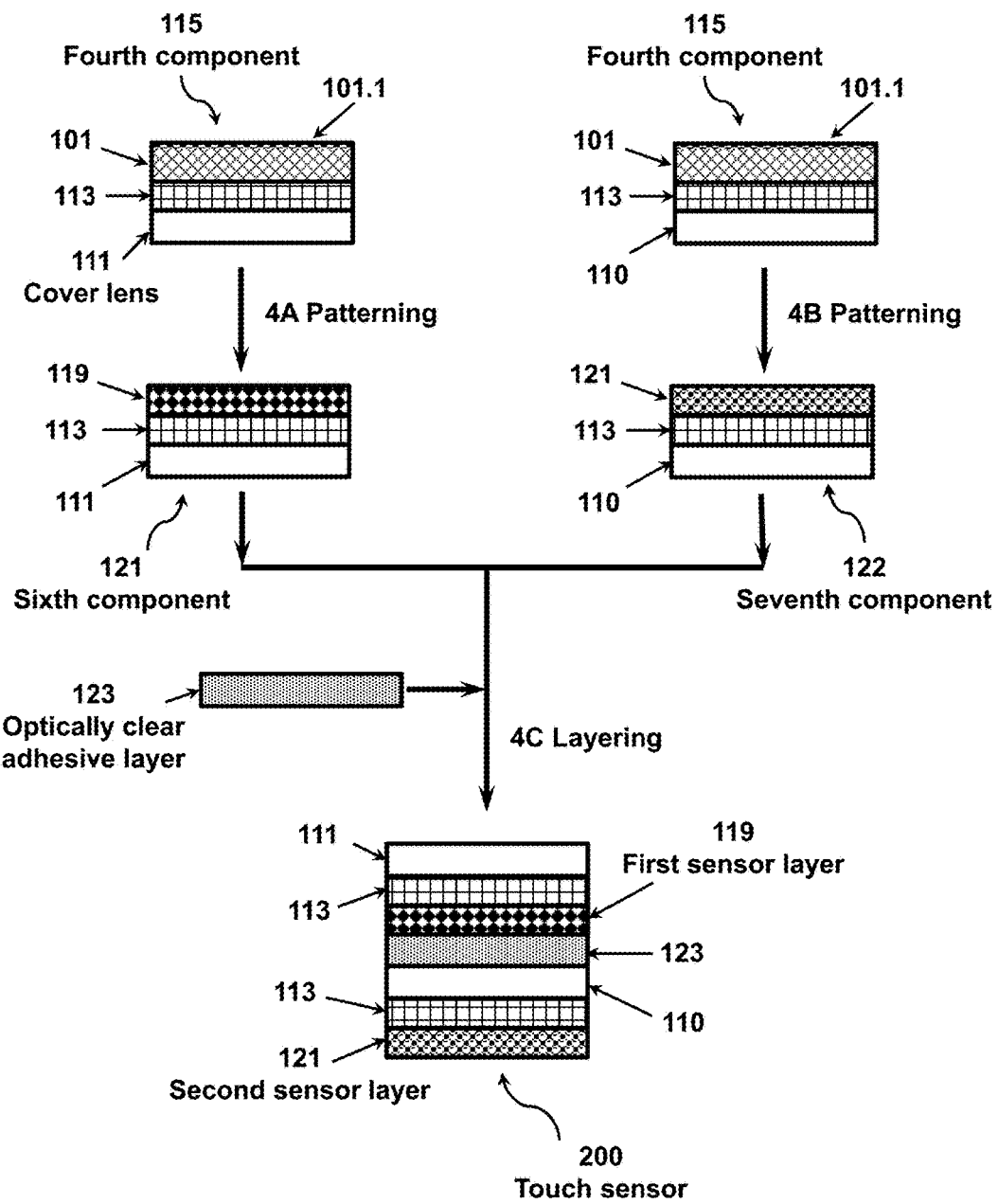
FIG. 17 is a drawing of an exemplary method of forming the touch sensor shown in FIG. 6. Features shown in this cross-sectional view of the system and other system components are not drawn to scale.
Figure 18:
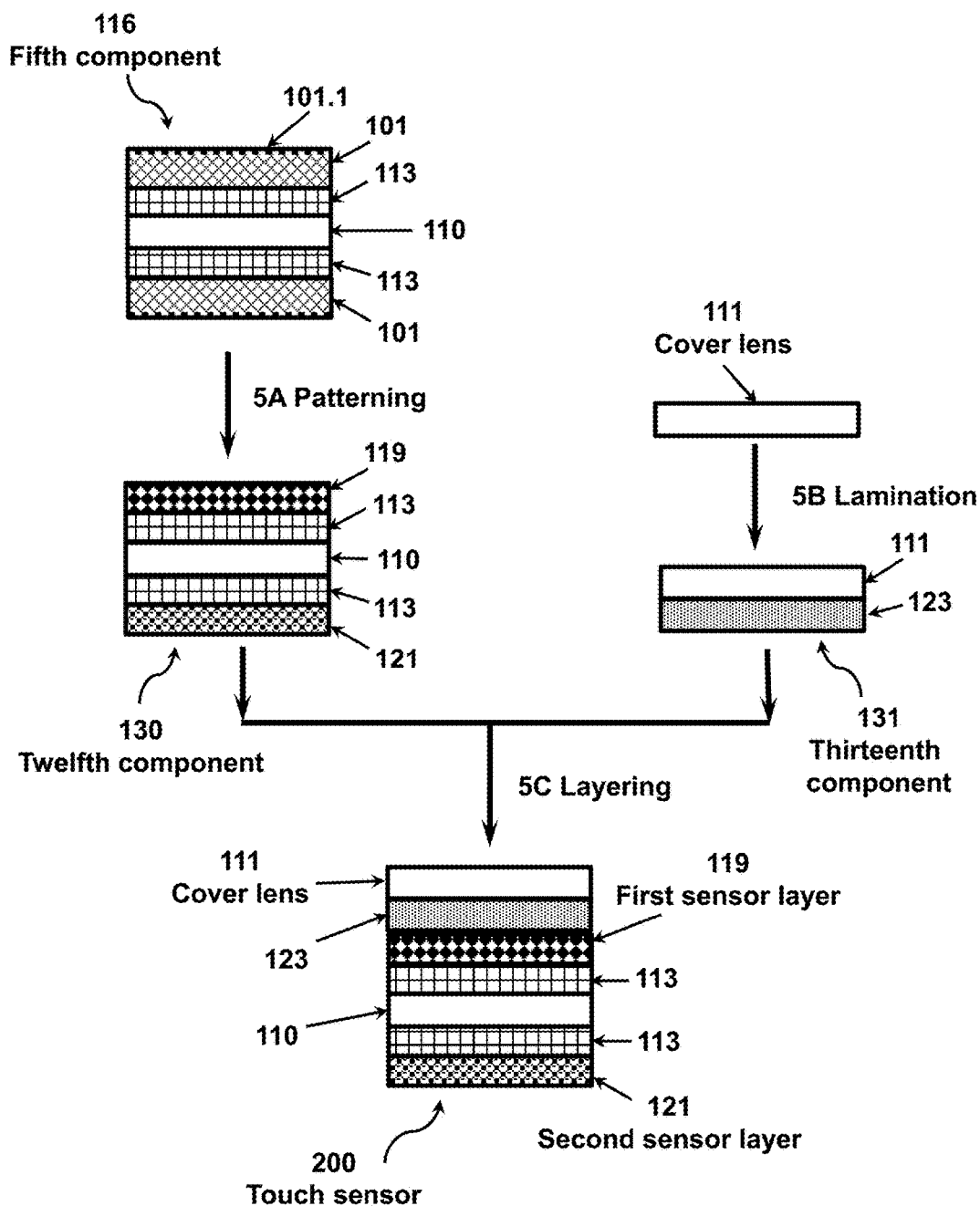
FIG. 18 is a drawing of an exemplary method of forming the touch sensor shown in FIG. 7. Features shown in this cross-sectional view of the system and other system components are not drawn to scale.

The electrically conductive nanomaterial may be oxidized if it is exposed to an oxidative environment. For example, a silver nanowire may be oxidized if it is exposed to air present in the environment. Because of such oxidation or other similar chemical reactions, electrical conductivity of the electrically conductive nanocomposite layer 101 may be degraded. The protective film 102 may prevent such electrical conductivity degradation particularly by isolating the front surface of the electrically conductive nanocomposite layer 101.1, for example, from an oxidative environment. During the use of the transferable electrically conductive nanocomposites for manufacturing of transparent conductive electrodes and/or systems comprising touch sensors, the protective film 102 may be peeled off, followed by immediate formation of other layers on the front surface of the electrically conductive nanocomposite layer 101.1. Examples of such methods are shown in FIGS. 17-18.

During such manufacturing, period of exposure of the front surface of the electrically conductive nanocomposite layer 101 to an oxidative environment may be minimized, and the degradation of its electrical properties may thereby be prevented.

In one example, the electrically conductive nanomaterial 114 may be uniformly distributed within the electrically conductive nanocomposite layer 101. In another example, the electrically conductive nanomaterial may be non-uniformly distributed within the electrically conductive nanocomposite layer 101. For example, (chemical) concentration of the electrically conductive nanomaterial at or around the front surface of the electrically conductive nanocomposite layer 101.1 may be higher than concentration of the electrically conductive nanomaterial at or around the back surface of the electrically conductive nanocomposite layer 101.2. Because of such concentration gradients of the electrically conductive nanomaterial, electrical conductivity of the electrically conductive nanocomposite layer may be higher at its front surface than at its back surface. In another example, as shown in FIG. 2, the electrically conductive nanomaterial 114 may be present in a concentrated form at or around the front surface 101.1. Exemplary scanning electron microscope (SEM) images of the front surface of such electrically conductive nanocomposite layers are shown in FIGS. 11-14.

Another example of the transferable electrically conductive nanocomposite 100 is shown in FIG. 3. In this example, the transferable electrically conductive nanocomposite 100 may comprise an electrically conductive nanocomposite layer 101, a protective film 102, and a release film 103. The release film 103 may adhere to the back surface of the electrically conductive nanocomposite layer 101.2. Or the release film 103 may be configured to adhere to the back surface of the electrically conductive nanocomposite layer 101.2. The protective film 102 may adhere to the front surface of the electrically conductive nanocomposite layer 101.1. Or the protective film 102 may be configured to adhere to the front surface of the electrically conductive nanocomposite layer 101.1. The adhesion between the electrically conductive nanocomposite layer 101 and the release film 103, and the adhesion between the electrically conductive nanocomposite layer 101 and the protective film 102 may be configured such that when the release film 103 is peeled off from the back surface of the electrically conductive nanocomposite layer 101.2, the protective film 102 may remain bonded to the front surface of the electrically conductive nanocomposite layer 101.1. For example, force of adhesion between the protective film 102 and the front surface of the electrically conductive nanocomposite layer 101.1 may be higher than force of adhesion between the release film 103 and the back surface of the electrically conductive nanocomposite layer 101.2. Such preferential peel off of the release film 103 over that of the protective film 102 may be desired, for example, to prevent degradation of electrical properties of the electrically conductive nanocomposite layer 101, as explained above.

Present invention is also related to a transparent conductive electrode, particularly to a transparent conductive electrode comprising a rigid substrate, such as a thick PMMA sheet, a thick PC sheet, or a glass sheet. The glass may comprise any type of glass.

The transparent conductive electrode may be manufactured by using the transferable electrically conductive nanocomposite 100 disclosed above. For example, a single-sided or a double-sided transparent conductive electrode may be manufactured by using the transferable electrically conductive nanocomposite 100 of this disclosure.

Figure 4:
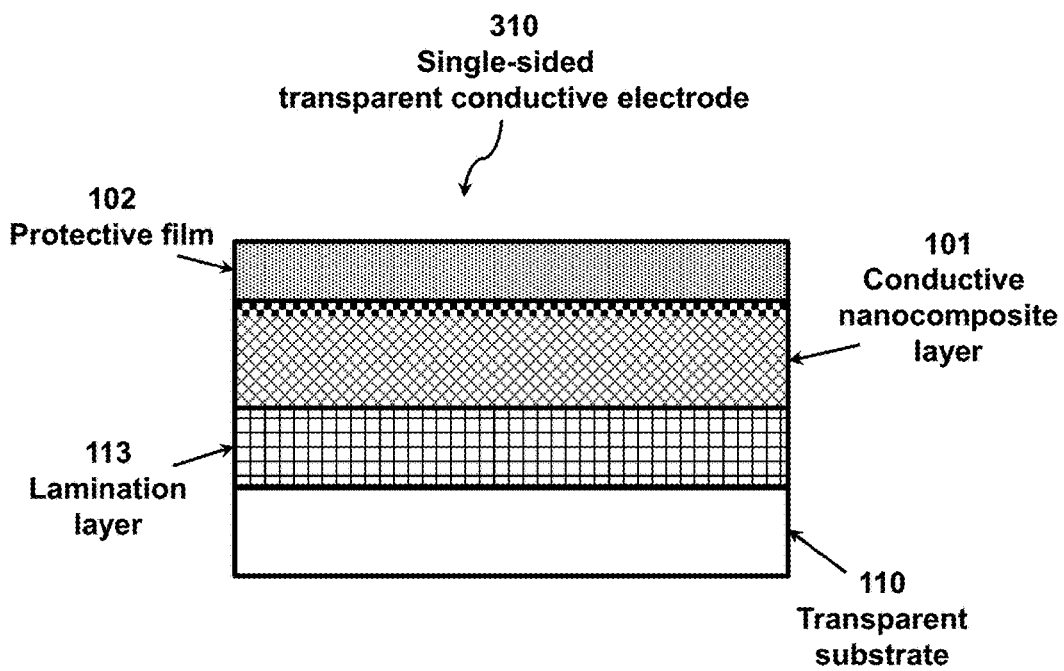
FIG. 4 is a drawing of an exemplary single-sided transparent conductive electrode comprising a protective film, an electrically conductive nanocomposite layer, a lamination layer, and a transparent substrate. Features shown in this cross-sectional view of the system are not drawn to scale.

FIG. 4 shows an exemplary single-sided transparent conductive electrode 310. Such electrode may comprise an electrically conductive nanocomposite layer 101, a lamination layer 113, and a transparent substrate 110. The lamination layer may be between the electrically conductive nanocomposite layer and the transparent substrate. Such electrode may further comprise a protective film 102. The protective film may be formed on the front surface of the conductive nanocomposite layer.

Figure 5:
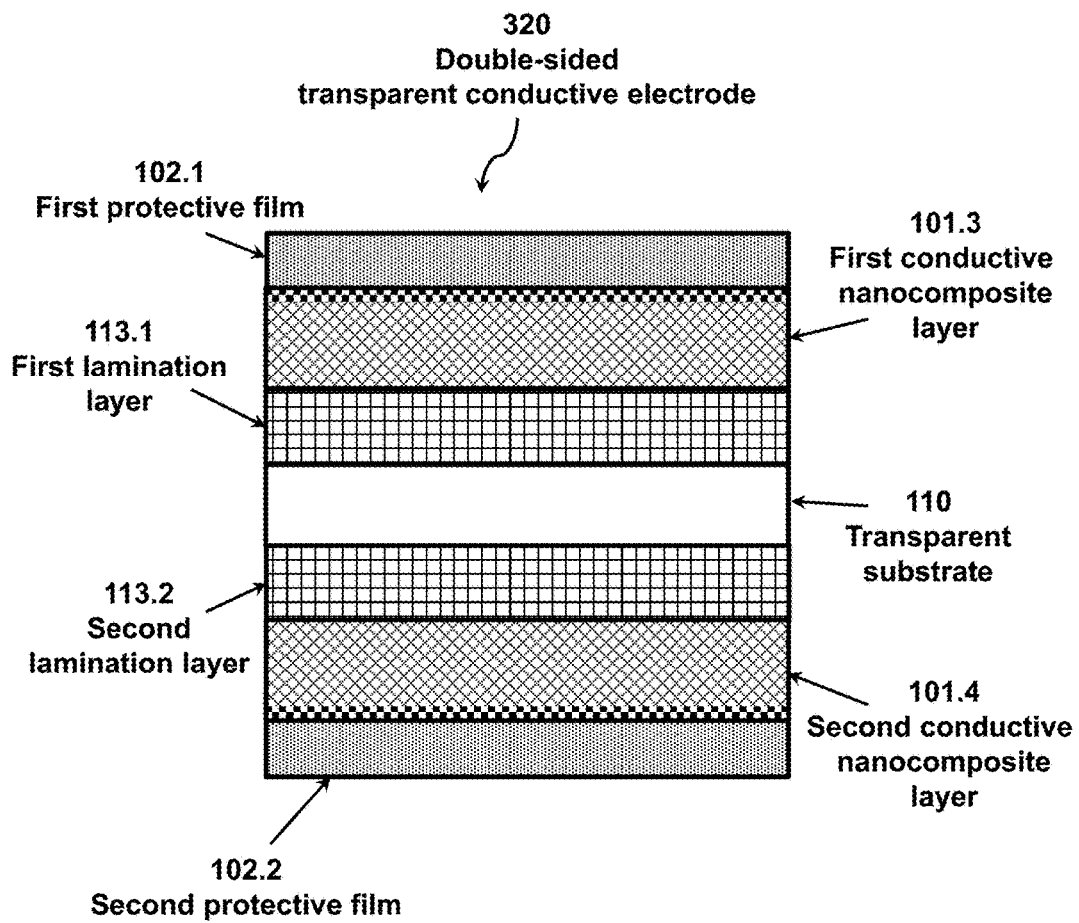
FIG. 5 is a drawing of an exemplary double-sided transparent conductive electrode comprising a first protective film, a first electrically conductive nanocomposite layer, a first lamination layer, a transparent substrate, a second lamination layer, a second conductive nanocomposite layer, and a second protective film. Features shown in this cross-sectional view of the system are not drawn to scale.

FIG. 5 shows an exemplary double-sided transparent conductive electrode 320. Such electrode may comprise a first electrically conductive nanocomposite layer 101.3, a first lamination layer 113.1, a transparent substrate 110, a second lamination layer 113.2, a second electrically conductive nanocomposite layer 101.4. The first lamination layer may be between the first electrically conductive nanocomposite layer and the transparent substrate. The second lamination layer may be between the second electrically conductive nanocomposite layer and the transparent substrate. The transparent substrate may be between the first lamination layer and the second lamination layer. Such electrode may further comprise a first protective film 102.1 and a second protective film 102.2. The first protective film may be formed on the front surface of the first conductive nanocomposite layer. The second protective film may be formed on the front surface of the second conductive nanocomposite layer.

In some examples, the protective film 102 may comprise poly(ethylene terephthalate) (PET), poly(methyl methacrylate) (PMMA), polycarbonate (PC), poly(ethylene naphthalate) (PEN), cellulose triacetate (TAC), polyimide (PI), or any combination thereof.

In some examples, the thickness of the protective film 102 may be in the range of 0.050 mm to 0.150 mm.

In some examples, the protective film 102 may be a high thermal stability flexible film. For example, the film may have low thermal expansion coefficient.

In one example, the protective film 102 may comprise a high thermal stability PET film. The PET film may be flexible such that it may be used as a carrier film for the conductive nanocomposite layer. The linear and horizontal thermal expansion of this PET film may be less than 1.0% and less than 0.5% respectively, so that the PET protective film can withstand the thermal treatment during manufacturing of the transferable electrically conductive nanocomposites.

In another example, the protective film 102 may comprise a thin PC film or a thin PMMA/PC film. PMMA's thermal stability may be lower than PET and tend to be brittle when it is a thin film. Both flexibility and thermal stability of the protective film may be improved when a double layer structure, such as a PMMA/PC film, is used. Although, the cost of the PMMA/PC film may be higher than that of the PET film used as a protective film, it may be used during manufacturing of a transferable conductive nanocomposite where high temperature thermal treatment may be required. Thus, the thin PC film and the thin PMMA/PC film are within the scope of this disclosure.

In another example, the protective film 102 may comprise a polyimide film, which may have the best thermal stability and flexibility available for a thin film. Although, its cost may prevent its large scale use as a protective film, it may be used during manufacturing of the transferable nanocomposites required for the applications where high temperature thermal treatment may be required. Thus, the polyimide film is within the scope of this disclosure.

In this disclosure, the release film 103 may be a flexible film. Thickness of the release film may be in the range of 0.05 mm to 0.15 mm. The flexible film may comprise PET, PMMA, PC, PEN, TAC, PI, or any combination thereof.

In this disclosure, the release film 103 may comprise a PET film and a mold releasing agent deposited on a surface of the PET film. Examples of the mold releasing agent may be silicon oil, poly(dimethylsiloxane), the like, or any combination thereof.

In this disclosure, the transparent substrate 100 may comprise PET, PMMA, PC, PEN, TAC, PI, a glass, or any combination thereof. The transparent substrate may be flexible or rigid. The glass may comprise any type of glass.

In one example, the transparent substrate may comprise a flexible PET film with a thickness in the range of 0.05 mm to 0.15 mm and a transmittance higher than 90% at about 550 nm. The flexible PET may comprise any type of PET.

In another example, the transparent substrate may comprise a flexible PC film with a thickness in the range of 0.05 mm to 0.15 mm and a transmittance higher than 90% at about 550 nm. The flexible PC may comprise any type of PC.

In another example, the transparent substrate may comprise a flexible PMMA/PC bilayer film with a thickness in the range of 0.05 mm to 0.15 mm and a transmittance higher than 90% at about 550 nm. The PMMA may comprise any type of PMMA. The PC may comprise any type of PC.

In another example, the transparent substrate may comprise a rigid PMMA sheet with a thickness in the range of 0.5 mm to 2 mm and a transmittance higher than 90% at about 550 nm. The rigid PMMA may comprise any type of PMMA.

In another example, the transparent substrate may comprise a rigid PC sheet with a thickness in the range of 0.5 mm to 2 mm and a transmittance higher than 90% at about 550 nm. The rigid PC may comprise any type of PC.

In another example, the transparent substrate may comprise a rigid PMMA/PC bilayer sheet with a thickness in the range of 0.5 mm to 2 mm and a transmittance higher than 90% at about 550 nm. The PMMA may comprise any type of PMMA. The PC may comprise any type of PC.

In another example, the transparent substrate may comprise a rigid PMMA/PC/PMMA tri-layer sheet with a thickness in the range of 0.5 mm to 2 mm and a transmittance higher than 90% at about 550 nm. The PMMA may comprise any type of PMMA. The PC may comprise any type of PC.

In another example, the transparent substrate may comprise a glass sheet with a thickness in the range of 0.05 mm to 2 mm and a transmittance higher than 90% at about 550 nm. The glass may comprise any type of glass.

In this disclosure, the first lamination layer 113.1 or the second lamination layer 113.2 may comprise a polyacrylate, a polymethacrylate, a polyurethane acrylate, a polyisocyanurate acrylate, a polyepoxide, or any combination thereof. In one example, the first lamination layer or the second lamination layer may comprise a polyacrylate with a thickness in the range of 0.05 micrometer to 15 micrometers. In another example, the first lamination layer or the second lamination layer may comprise a polymethacrylate with a thickness in the range of 0.05 micrometer to 15 micrometers. In another example, the first lamination layer or the second lamination layer may comprise a polyurethane acrylate with a thickness in the range of 0.05 micrometer to 15 micrometers.

The present disclosure also generally relates to a system comprising a touch sensor. The present disclosure also generally relates to an electronic system comprising a touch sensor. Examples of such touch sensors are shown in FIGS. 6 and 7.

FIG. 6 shows an exemplary touch sensor 200 comprising a cover lens 111, a first lamination layer 113.1, a first sensor layer 119, an optically clear adhesive layer 123, a transparent substrate 110, a second lamination layer 113.2, and a second sensor layer 121. The cover lens 111, the first lamination layer 113.1, the first sensor layer 119, the optically clear adhesive layer 123, the transparent substrate 110, the second lamination layer 113.2, and the second sensor layer 121 each may have a front surface and a back surface. The first lamination layer 113.1 may be between the cover lens 111 and the first sensor layer 119. The optically clear adhesive layer 123 may be between the first sensor layer 119 and the transparent substrate 110. The second lamination layer 113.2 may be between the transparent substrate 110 and the second sensor layer 121. The cover lens 111 may be formed on the front surface of the first lamination layer 113.1. The first lamination layer 113.1 may be formed on the front surface of the first sensor layer 119. The first sensor layer 119 may be formed on the front surface of the optically clear adhesive layer 123. The optically clear adhesive layer 123 may be formed on the front surface of the transparent substrate 110. The transparent substrate 110 may be formed on the front surface of the second lamination layer 113.2. The second lamination layer 113.2 may be formed on the front surface of the second sensor layer 121.

FIG. 7 shows an exemplary touch sensor 200 comprising a cover lens 111, an optically clear adhesive layer 123, a first sensor layer 119, a first lamination layer 113.1, a transparent substrate 110, a second lamination layer 113.2, and a second sensor layer 121. The cover lens 111, the optically clear adhesive layer 123, the first sensor layer 119, the first lamination layer 113.1, the transparent substrate 110, the second lamination layer 113.2, and the second sensor layer 121 each may have a front surface and a back surface. The optically clear adhesive layer 123 may be between the cover lens 111 and the first sensor layer 119. The first lamination layer 113.1 may be between the first sensor layer 119 and the transparent substrate 110. The second lamination layer 113 may be between the transparent substrate 110 and the second sensor layer 121. The cover lens 111 may be formed on the front surface of the optically clear adhesive layer 123. The optically clear adhesive layer 123 may be formed on the front surface of the first sensor layer 119. The first sensor layer 119 may be formed on the front surface of the first lamination layer 113.1. The first lamination layer 113.1 may be formed on the front surface of the transparent substrate 110. The transparent substrate 110 may be formed on the front surface of the second lamination layer 113.2. The second lamination layer 113.2 may be formed on the front surface of the second sensor layer 121.

In one example, the touch sensor may comprise two sensor layers. The first sensor layer may be formed on a back surface of the cover lens, as shown in FIG. 17. The cover lens may comprise PET, PMMA, PC, a glass, or any combination thereof. The glass may comprise any type of glass. The cover lens may be flexible or rigid. The second touch sensor layer may be formed on a transparent substrate. The transparent substrate may be flexible or rigid. The transparent substrate may comprise PET, PMMA, PC, a glass, or a combination thereof. The glass may comprise any type of glass. These two sensor layers may be combined by using an optical clear adhesive (OCA) to form a touch sensor.

In another example, two touch sensor layers may be formed by patterning a double sided transparent conductive electrode, and assembled with a cover lens by using an optically clear adhesive, as shown in FIG. 18.

In this disclosure, the transparent conductive electrode may be manufactured by using a roll-to-roll, or a roll-to-sheet high throughput lamination process by using the transferable conductive nanocomposite and the transparent substrate.

In one example, the transparent conductive electrode may be formed on a flexible substrate by using a roll-to-roll high throughput process. A liquid lamination formulation ("lamination liquid") may be applied between the flexible transparent substrate and the back surface of the transferable conductive nanocomposite, thereby forming a component. Excess amount of the lamination liquid may be driven off by applying pressure on the back surface and the front surface of this component. A UV or a thermal curing of the component may solidify the lamination liquid. The transparent conductive electrode may thereby be prepared.

In another example, the transparent conductive electrode may be formed on a rigid substrate by using a roll-to-sheet high throughput process. The liquid lamination formulation may be applied between the rigid transparent substrate and the back surface of the transferable conductive nanocomposite, thereby forming a component. Excess amount of the lamination liquid may be driven off by applying pressure on the back surface and the front surface of this component. A UV or a thermal curing of the component may solidify the lamination liquid. The transparent conductive electrode may thereby be prepared.

In this disclosure, the transparent substrate may comprise a rigid material, for example, a glass or a thick polymer sheet. The glass may comprise any type of glass. Depending on the nature of the rigid transparent substrate, a surface treatment of the rigid transparent substrate may be necessary to improve the adhesion between the electrically conductive nanocomposite layer and the transparent substrate.

In one example, the rigid transparent substrate may comprise a PMMA sheet with a thickness in the range of 0.5 mm to 2 mm. The surface treatment for this substrate may not be required when a roll-to-sheet the lamination process and a lamination layer comprising a polyacrylate is used. In this example, the adhesion between the conductive nanocomposite layer and the transparent substrate may have desired strength.

In another example, the rigid transparent substrate may comprise a glass. The glass may comprise any type of glass. In this example, a surface treatment of the glass may be necessary to improve the adhesion between the conductive nanocomposite layer and the substrate.

In one example, the glass surface treatment may comprise treating a surface of a glass substrate by using a formulation comprising a siloxane oligomer ("siloxane oligomer formulation"). This example is schematically demonstrated in FIGS. 19-21 and 23-24. The siloxane oligomer may be prepared by hydrolysis of a trialkoxysilane which has a general chemical structure:

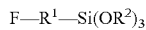

Where F is a UV or a thermally curable functional group, which may comprise an acryloxy, a methacryloxy, or an epoxy group. $R^1$ is $C_3$ to $C_{20}$ alkylene group, $R^2$ is a $C_1$ to $C_5$ alkyl group. Hydrolysis of the trialkoxysilane by using an acid as a catalyst may produce a functional silanol that may form a functional siloxane oligomer through condensation:

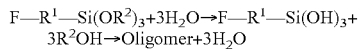

An average molecular weight of the siloxane oligomer may be in the range of 100 to 20,000; or may be in the range of 500 to 1,000.

Examples of One example of the trialkoxysilane may be methacryloxy propyltrimethoxysilane. Hydrolysis and condensation of this trialkoxysilane in acetic acid solution may produce a siloxane oligomer with a UV curable functional group. The oligomer may be separated from the reaction mixture by phase separation and dissolved in an alcohol or an alcohol mixture to form a formulation suitable for the glass surface modification.

The (chemical) concentration of the siloxane oligomer in the siloxane oligomer formulation may be in the range of 5 ppm to 1 wt %; or in the range of 0.001 wt % to 0.1 wt %. Application of the surface modification formulations might be carried out by a coating process, such as a spray coating process, a slot die process, a dip coating process, or a Meyer rod coating process. The spray coating process may form a uniform thin layer of siloxane oligomer coating on a surface of the glass substrate.

After the siloxane oligomer is applied on a surface of a glass substrate, the glass substrate may be heat treated in an oven for a time period in the range of 5 minutes to 20 minutes and at a temperature in the range of 80° C. to 150° C. to form a coupling layer on the surface of the glass substrate. The thickness of the coupling layer may be in the range of 0.001 nm to 0.1 micrometer.

A roll-to-sheet lamination process may then be carried out by applying a liquid lamination formulation between the back surface of the transferable conductive nanocomposite and the surface treated glass substrate. UV curing of the liquid lamination formulation may result in a transparent conductive electrode comprising a conductive nanocomposite layer, a lamination layer and a glass substrate with a strong adhesion between these components.

The touch sensors may be manufactured by patterning a transferable conductive nanocomposite. Exemplary methods of manufacturing the exemplary touch sensors are disclosed below.

The sensor layer may comprise a pattern such that an electronic system comprising the touch sensor of this disclosure may detect a touch. The pattern of the sensor layer may be manufactured by removal of a material from the electrically conductive nanocomposite layer such that the electronic system can detect a touch. The patterning of the electrically conductive nanocomposite layer may provide a touch sensor.

The electrically conductive nanomaterial layer may comprise an electrically conductive nanomaterial and a polymer. The electrically conductive nanocomposite layer may be patterned by removal of the electrically conductive nanomaterial from the electrically conductive nanocomposite layer with a predetermined amount such that the electronic system can detect a touch.

The electrically conductive nanomaterial may comprise any metal that has any shape. For example, the electrically conductive nanomaterial may comprise a silver nanowire.

The electronic system may be a display system comprising the touch sensor. The display system may be a liquid crystal display, a light emitting display, a light emitting organic display, a plasma display, an electrochromic display, an electrophoretic display, an electrowetting display, an electrofluidic display, or a combination thereof.

EXAMPLE 1

Following materials were used in the examples disclosed below.

PET films, with thickness of about 100 micrometers were purchased from SPF Energetic Film (China), with a product number WCD-100 μm, and used as protective films 102. These films had high thermal stability, with a linear thermal expansion rate of about 0.5% and about 1.0% at horizontal and vertical directions respectively.

Silicon oil coated PET films (CT1) were purchased from Alivin Film (China), with a product number 3140709012, and used as release films 103. The thickness of these films was about 75 micrometers. The peeling adhesion of these films was measured by FTM1-FINAT method No. 1 at 180° and at a peeling speed of about 300 mm/min. The measured peeling adhesion of these films was T1.

PMMA substrates were purchased from Shenzhen Huiwanchuan Plastic Film Co., Ltd. Thickness of these PMMA substrates was about 0.8 mm.

Glass substrates were about 1 mm thick microscopic glass slides.

Silver nanowires with an average diameter of about 35 nm, were purchased from Zhejiang Kechuang Advanced Material Co. Ltd. with a product number AW030-LP.

Monomers for preparation of the transferable electrically conductive nanocomposite layers were purchased from Sartomer Inc. These monomers included SR285, SR238 NS, SR351 NS, SR256, SR350 NS, SR508 NS, SR 601 NS, SR348 L, CN989 NS, SR368 NS, and CN9010 NS.

Catalysts and antioxidants, Irgacure 754, Irgacure 184, and Irganox 1010 were purchased from BASF.

Siloxane coupling agent KH-570 (OFS-6030) was obtained from Dow Corning.

Silver nanowire layers were formed by using a Meyer rod drawdown machine model FA-202D from FUAN enterprises in China, and by using Meyer rods #5, #8, #10, and #13.

Thermal treatment of layers was performed in a regular oven, model DGG-9070A from Shanghai Sengxing Equipment Inc. in China. UV curing was carried out by using a conveyor belt system made by Jiangsu RUCHAO Inc. (China), which was equipped with Fusion F300s as a UV light source.

Transmittance of the transparent conductive electrode was measured by using a UV-VIS-NIR spectrometer. Sheet resistance of the transparent conductive electrode was measured by four probe method by using an R-CHEK model RC2175 from EDTM (Electronic Design to Market Inc.).

EXAMPLES 2-5

Transferrable Silver Nanowire Nanocomposite

Figure 8:
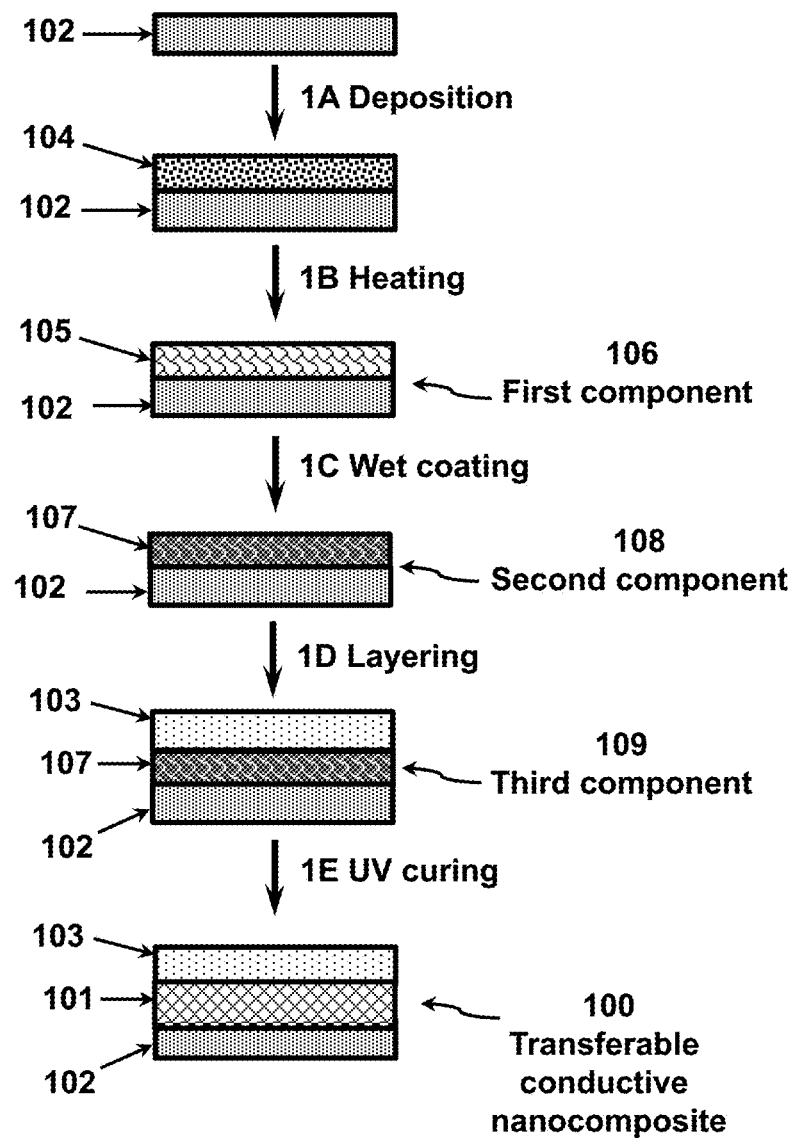
FIG. 8 is a drawing of an exemplary method of producing the exemplary transferable electrically conductive nanocomposite shown in FIG. 3. Features shown in this cross-sectional view of the system and other system components are not drawn to scale.

Example 2 was carried out as follows. A PET film WCD-100 μm was the protective film 102. Referring to FIG. 8, a silver nanowire dispersion was prepared by diluting the AW030-LP by isopropanol to obtain a mixture with a silver nanowire concentration of about 4.0 mg/ml. Then, a liquid silver nanowire dispersion layer 104 was formed on the PET film, by using the Meyer rod #5 and the drawdown machine (1A Deposition). After the formed component was air dried for about 2 minutes, it was moved into a regular oven and heated for about 5 minutes at about 150° C. (1B Heating). A first component 106 comprising a dried nanomaterial layer 105 and a protective film 102 was thereby prepared.

On the silver nanowire layer 105, a liquid formulation comprising (a) monomers: SR 285, SR238, SR351; and (b) catalysts: Irgacure 754 and Iganox 1010 was applied (1C Wet coating). A second component 108 comprising a conductive nanomaterial and liquid monomer mixing layer 107 was thereby formed. Then, a release PET film CT1 103, with its silicon coated surface facing the conductive nanomaterial and liquid monomer mixing layer 107, was layered on the mixing layer (1D Layering). Excess amount of the liquid formulation was driven off by applying the Meyer rod #0 on the drawdown machine. The third component 109 was thereby obtained. Then, this component was moved to a UV conveyor system and cured, at a belt speed of about 3 ft/min, to obtain a transferable silver nanowire nanocomposite 100 (1E UV curing).

Example 3 was carried out in the same manner disclosed in Example 2, except that the liquid silver nanowire dispersion layer 104 was formed by using the Meyer rod #8 instead of the Meyer rod #5.

Example 4 was carried out in the same manner disclosed in Example 2, except that the liquid silver nanowire dispersion layer 104 was formed by Meyer rod #10 instead of the Meyer rod #5.

Example 5 was carried out in the same manner disclosed in Example 2, except that the silver nanowire was formed by using rod #13 instead of the Meyer rod #5.

EXAMPLE 6

Preparation of Single-sided Transparent Conductive Electrode

Figure 9:
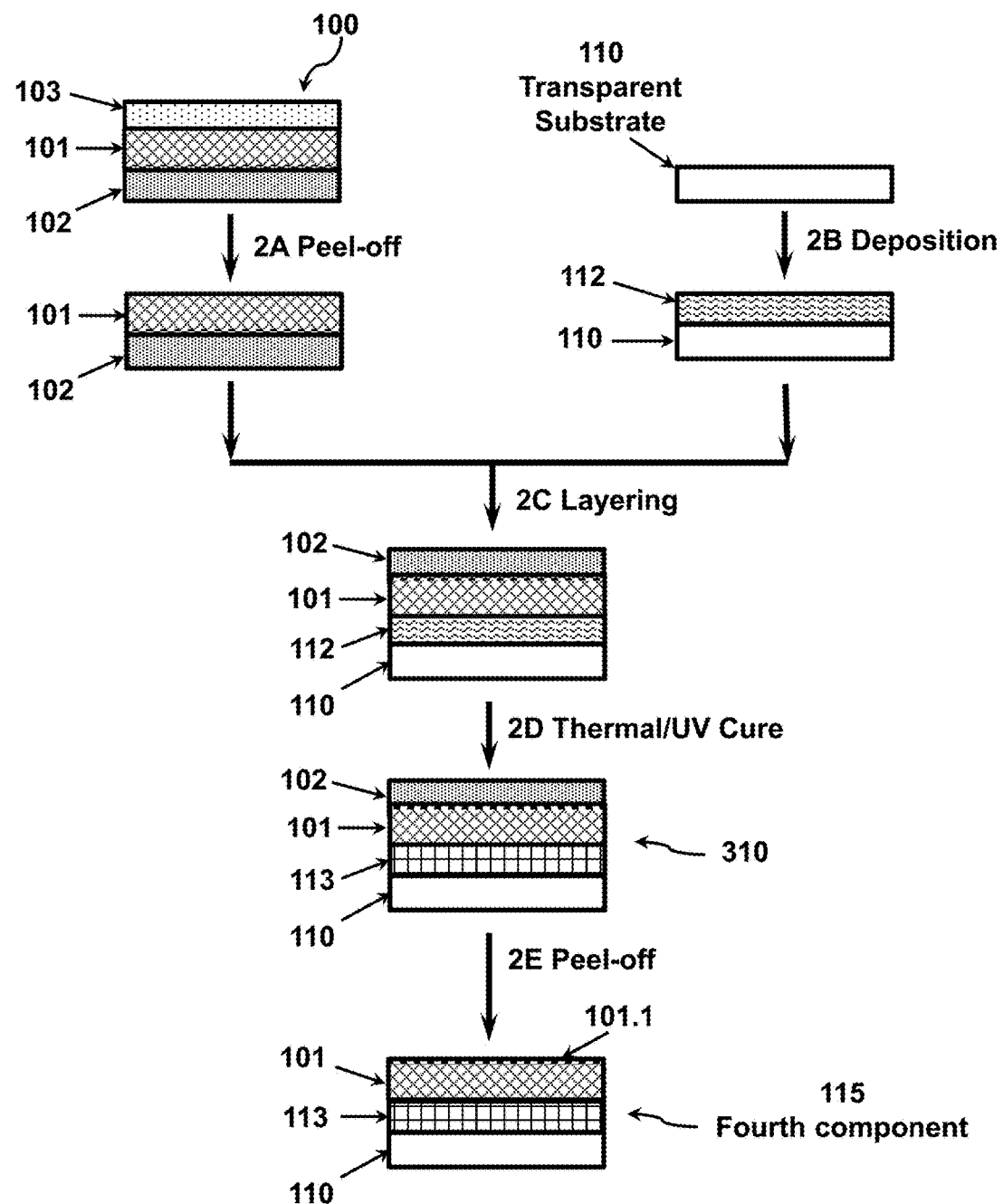
FIG. 9 is a drawing of an exemplary method of producing the exemplary single-sided transparent conductive electrode shown in FIG. 4. Features shown in this cross-sectional view of the system and other system components are not drawn to scale.

This example was carried out, as shown in FIG. 9, as follows. In this example, the transferable silver nanowire nanocomposite 100 prepared in Example 2 was used. The release PET film 103 was first peeled off from the transferable nanocomposite (2A Peel-off). On a rigid PMMA substrate 110, a lamination liquid formulation containing (a) monomers SR 285, SR238, and SR351; and (b) catalysts: Irgacure 754 and Iganox 1010 was applied (2B Deposition). This formed a component comprising a liquid lamination formulation layer 112 and a transparent substrate 110. The transferable conductive nanocomposite 100 was then layered on the liquid lamination formulation layer 112 with its back surface 101.2 contacting with the liquid layer (2C Layering). Excess amount of the liquid lamination formulation layer 112 was driven off by applying the Meyer rod #0 on the drawdown machine. The component thereby prepared was then moved to the UV belt conveyor system and cured at about 3 ft/min speed, to obtain a single-sided transparent conductive electrode 310 (2D Thermal/UV Cure). A single-sided transparent conductive electrode 310 on a rigid transparent substrate was thereby formed as Sample 1. Finally, the protective film 102 was peeled off to form the fourth component 115 (2E Peel-off).

EXAMPLE 7

Single-sided Transparent Conductive Electrode with Different Sheet Resistance

In this example, the process was carried out in the same manner as disclosed in Example 6, except that the transferrable silver nanowire nanocomposites prepared in Examples 3-5 were used. Three transparent conductive electrodes were thereby prepared as Sample 2, Sample 3 and Sample 4.

EXAMPLE 8

SEM Photographs of Single-sided Transparent Conductive Electrodes

Referring to FIG. 9, the PET protective film 102 was peeled off, exposing the front surface of the silver nanowire nanocomposite layer 101.1. A fourth component 115 comprising an electrically conductive nanocomposite layer, a solid lamination layer, and a transparent substrate was thereby prepared. FIGS. 11-14 show the morphology of the front surfaces 101.1 of the fourth component, Samples 1 to 4 respectively. These results demonstrated that the surface morphology of the transparent conductive electrodes may be controlled. The Sample 1 had the lowest silver nanowire concentration on its front surface. The Sample 4 had the highest silver nanowire concentration on its front surface. That is, the electrically conductive nanocomposite layers with increasingly concentrated nanomaterial on or around their surfaces may be formed.

EXAMPLE 9

Figure 15:
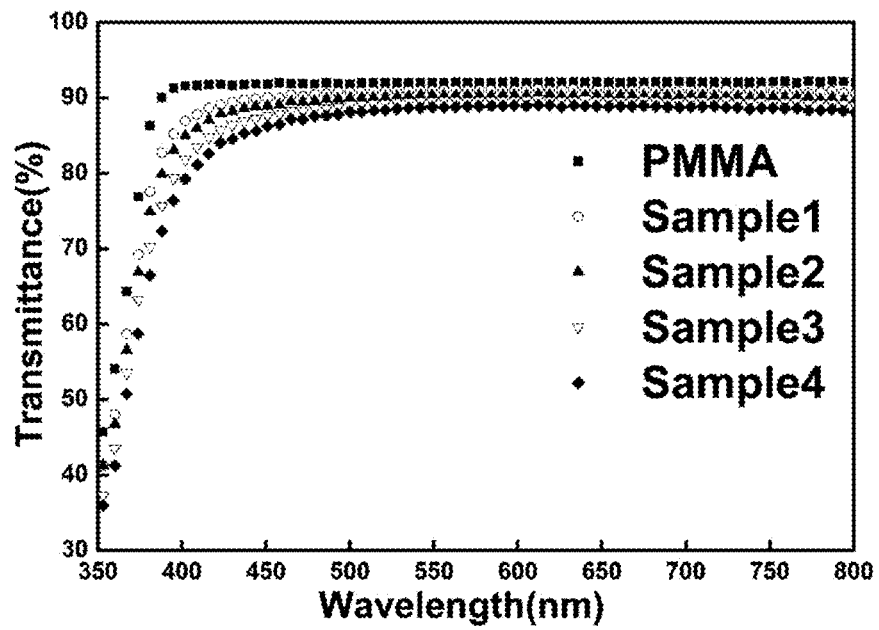
FIG. 15 is a graph showing optical transparencies of four exemplary single-sided transparent conductive electrodes ("Samples 1-4") and the transparent substrate used in manufacturing of this system poly(methyl methacrylate) (PMMA).

Transmittance of Single-sided Transparent Conductive Electrodes Comprising PMMA Sheets Referring to FIG. 9, the PET protective film 102 was first peeled off, exposing the front surface of the silver nanowire nanocomposite layer 101.1. UV-VIS spectra of the Samples 1-4 were then measured, and shown in FIG. 15. The transmittance of these samples were higher than 88.5% at about 550 nm. The transmittance decreased with increasing concentration of the silver nanowire on the front surface 101.1, that is, the transmittance decreased from Sample 1 to Sample 4.

EXAMPLE 10

Figure 16:
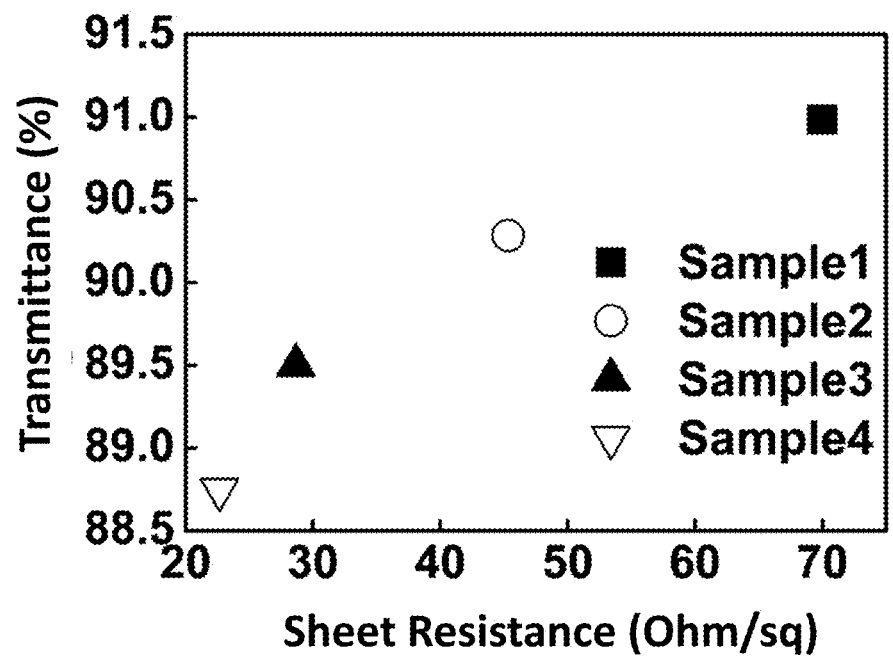
FIG. 16 is a graph showing optical transparencies and sheet resistances of four exemplary single-sided transparent conductive electrodes ("Samples 1-4") and their sheet resistance.

Sheet Resistance and Transmittance of Single-sided Transparent Conductive Electrodes Comprising PMMA Sheets The variation of the transmittance with the sheet resistance of Samples 1-4 are shown in FIG. 16. As expected, the transmittance decreased with decreasing sheet resistance. Sample 1 had the lowest silver nanowire concentration on its surface, and the highest transmittance, about 91%, but with highest sheet resistance about 70 ohms/square. Sample 4 had the highest silver nanowire concentration on its surface, and the lowest sheet resistance of about 20 ohms/square, but with the lowest transmittance, about 88.5%. These examples demonstrated that the sheet resistance and the transmittance of the transparent conductive electrodes may be varied. Thus, the electrodes with different properties may be provided to satisfy varying demands of the display system manufacturers. Thus, all such electrodes are within the scope of this disclosure.

EXAMPLE 11

Figure 10:
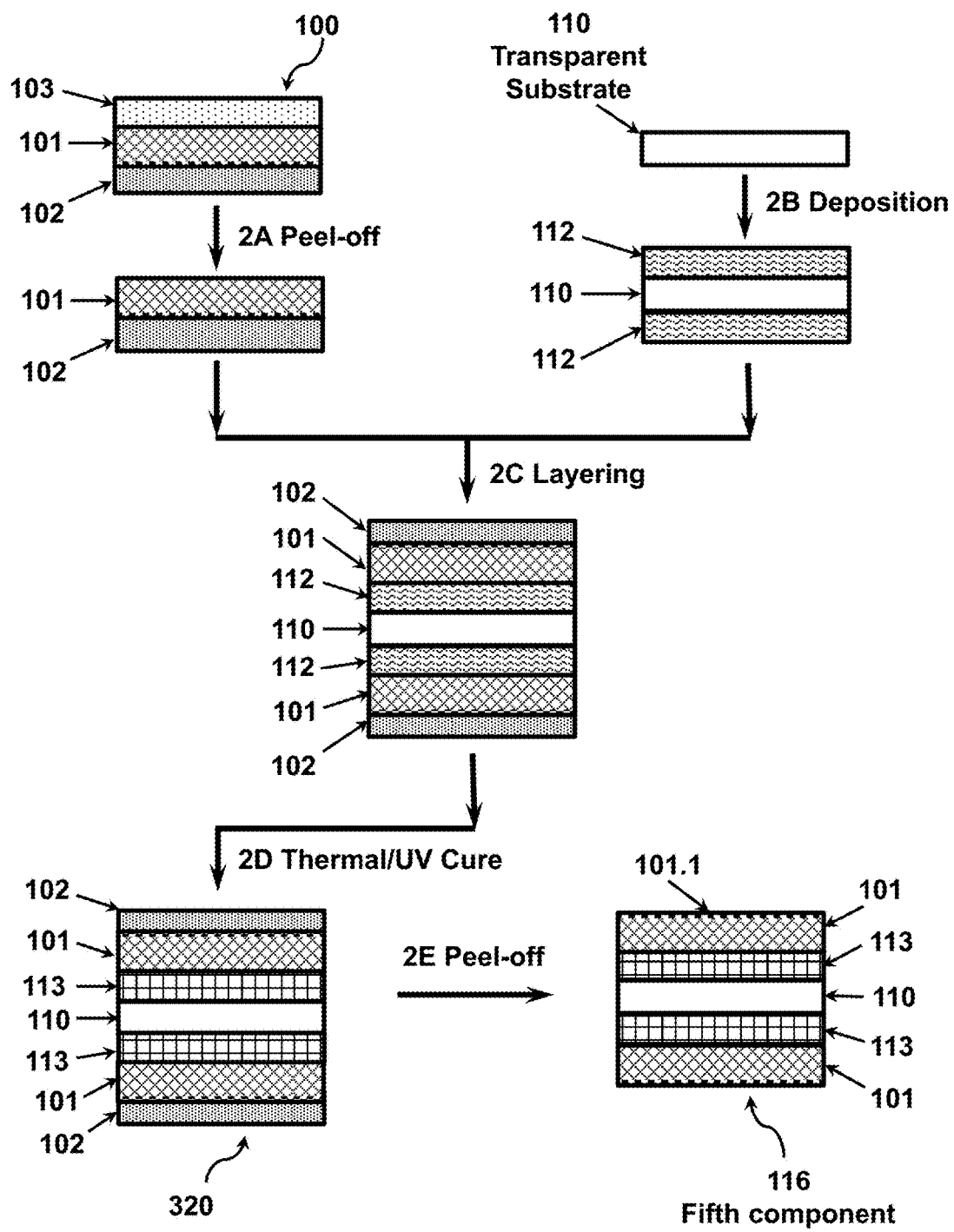
FIG. 10 is a drawing of an exemplary method of producing the exemplary double-sided transparent conductive electrode shown in FIG. 5. Features shown in this cross-sectional view of the system and other system components are not drawn to scale.
Figure 11:
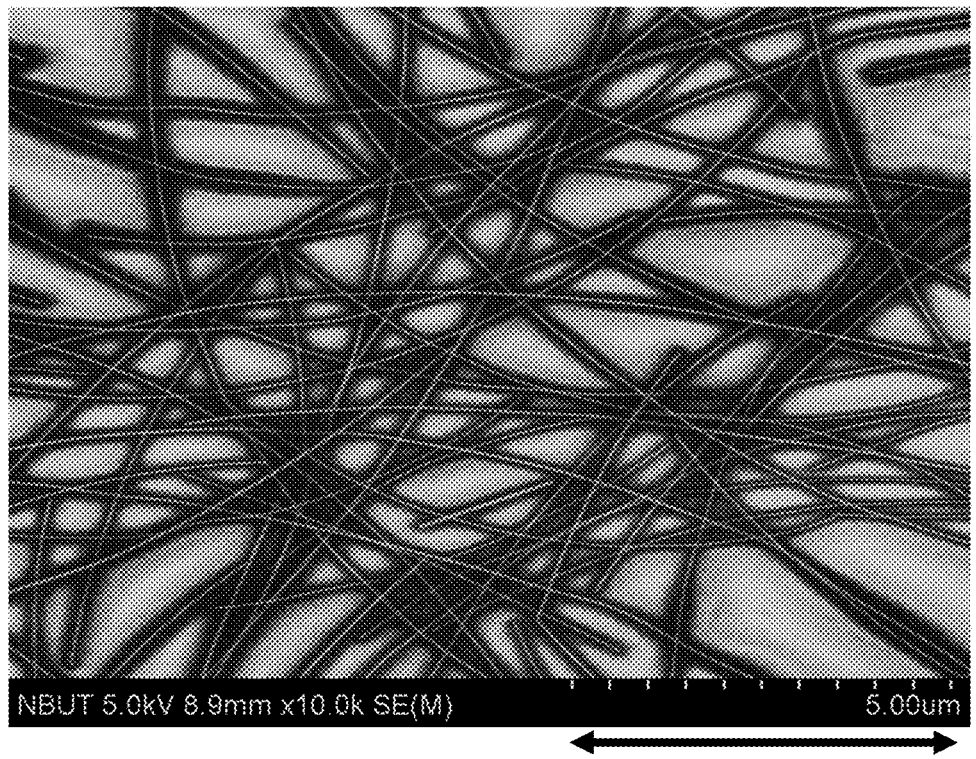
FIG. 11 is an exemplary scanning electron microscope (SEM) image of the front surface of an exemplary single-sided transparent conductive electrode. Filamentary structures shown on this image are silver nanowires. The scale bar (i.e. the black arrow) on the image is about 5 micrometers long.
Figure 12:
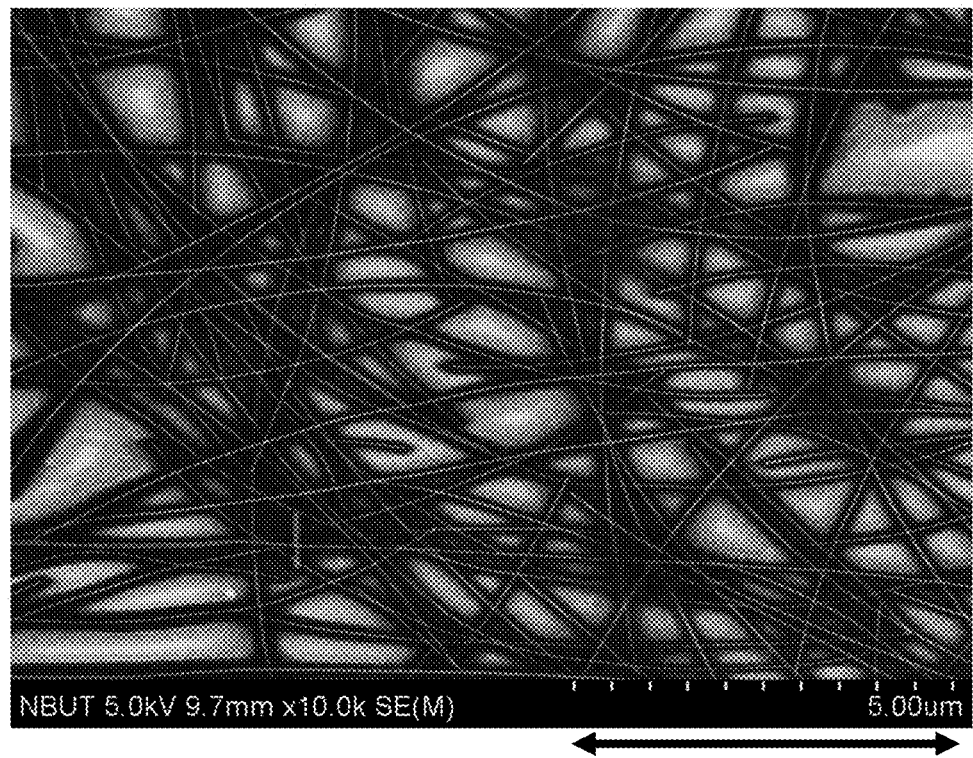
FIG. 12 is an exemplary scanning electron microscope (SEM) image of the front surface of exemplary single-sided transparent conductive electrode. Filamentary structures shown on this image are silver nanowires. The scale bar (i.e. the black arrow) on the image is about 5 micrometers long.
Figure 13:
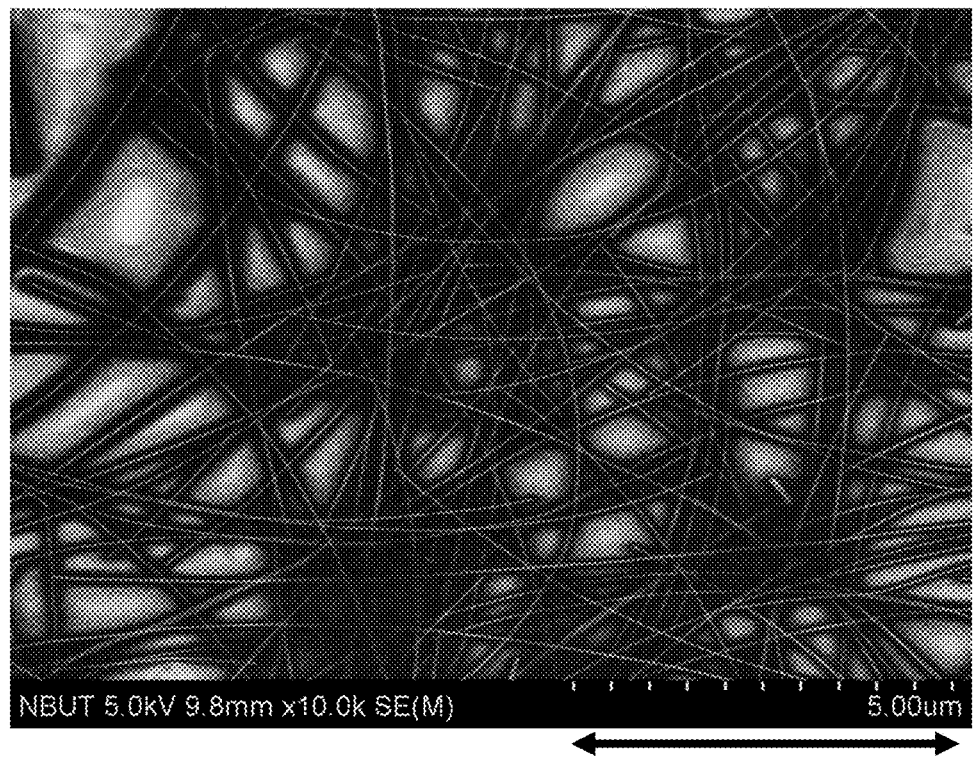
FIG. 13 is an exemplary scanning electron microscope (SEM) image of the front surface of an exemplary single-sided transparent conductive electrode. Filamentary structures shown on this image are silver nanowires. The scale bar (i.e. the black arrow) on the image is about 5 micrometers long.
Figure 14:
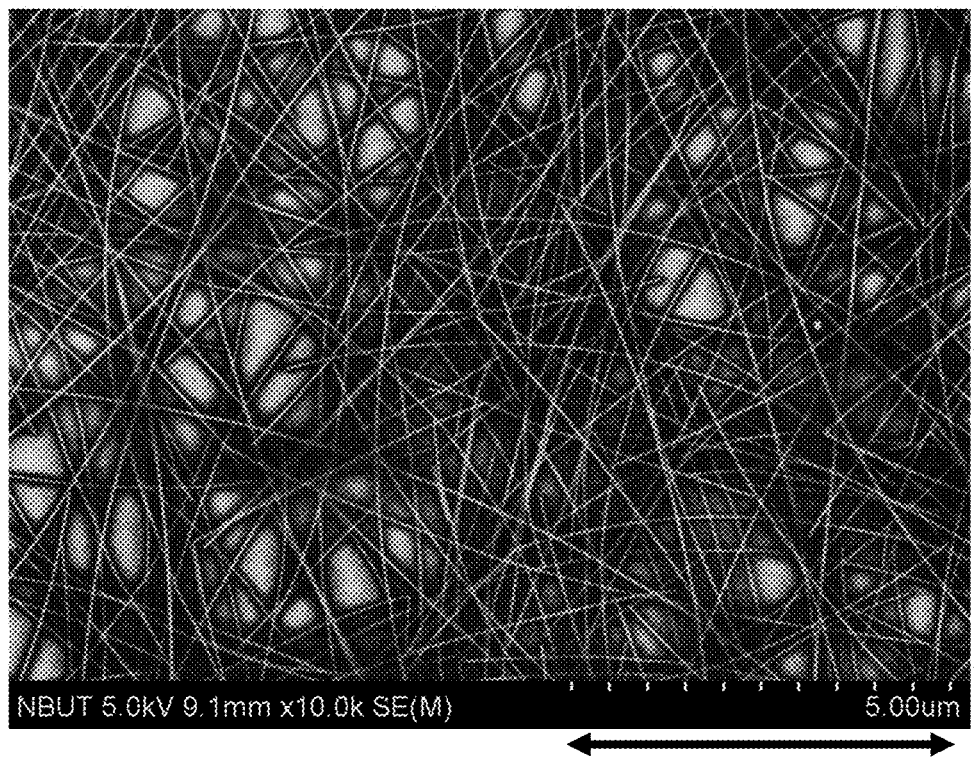
FIG. 14 is an exemplary scanning electron microscope (SEM) image of the front surface of an exemplary single-sided transparent conductive electrode. Filamentary structures shown on this image are silver nanowires. The scale bar (i.e. the black arrow) on the image is about 5 micrometers long.

Preparation of a Double-sided Transparent Conductive Electrode Comprising a PMMA Sheet In this example, a double-sided transparent conductive electrode comprising a PMMA sheet was prepared by following the process shown in FIG. 10. First, the release films 103 were peeled-off from two transferable conductive nanocomposites 100 (2A Peel-off). (Only one of the two transferable electrically conductive nanocomposite is shown in this figure.) Then, the front surface and the back surface of a transparent substrate were coated with a first liquid lamination layer and a second liquid lamination layer (2B Deposition). Each lamination layer comprised (a) monomers: SR 285, SR238, and SR351; and (b) catalysts: Irgacure 754 and Iganox 1010.

The first transferable conductive nanocomposite was layered on the first liquid lamination layer with the back surface of the electrically conductive nanocomposite layer facing the first liquid lamination layer. The second transferable conductive nanocomposite was layered on the second liquid lamination layer with the back surface of the electrically conductive nanocomposite layer facing the second liquid lamination layer (2C Layering).

Excess amount of the liquid from the liquid lamination layer 112 was driven off by applying the Meyer rod #0 on the drawdown machine. The component thereby prepared was then moved to the UV belt conveyor system and cured at about 3 ft/min speed, to obtain a double-sided transparent conductive electrode 320 (2D Thermal/UV Cure). The fifth component 116 was formed by peeling off of the protective films from the double-sided transparent conductive electrode (2E Peel-off).

EXAMPLE 12

Preparation of a Touch Sensor by Patterning of a Conductive Nanocomposite Layer

The electrically conductive nanocomposite 101 layer may be patterned to form a touch sensor. For example, a pattern may be formed on the front surface of the electrically conductive nanocomposite layer 101.1 to prepare a touch sensor.

In this process, a protective film 102 may first be removed from the transparent conductive electrode before the patterning. Examples of this process are shown in FIGS. 9 and 17.

For example, as shown in FIG. 9, 2E, the protective film 102 may be peeled off from the single-sided transparent conductive electrode 310. This may form a fourth component comprising an electrically conductive nanocomposite layer, a solid lamination layer, and a transparent substrate. The front surface of the electrically conductive nanocomposite layer may thereby be exposed for the patterning process.

In another example, as shown in FIG. 10, 2E, the protective films 102 may be peeled off from the double-sided transparent conductive electrode 320. This may form a fifth component comprising a first electrically conductive nanocomposite layer, a first solid lamination layer, a transparent substrate, a second solid lamination layer, and a second electrically conductive nanocomposite layer. The front surface of the first electrically conductive nanocomposite layer and the front surface of the second electrically conductive layer may thereby be both exposed for the patterning process.

The pattern of the sensor layer may be manufactured by removal of a material from the electrically conductive nanocomposite layer such that the electronic system can detect a touch. This removal may be achieved by any suitable method. The patterning method may be a dry or a wet process. An example of the patterning method is disclosed in a U.S. Provisional Patent Application to Hailiang Wang, entitled "Etching Compositions for Transparent Conductive Layers Comprising Silver Nanowires" U.S. Patent Application No. 62/193,218; filed Jul. 16, 2015. The entire content of this patent application is incorporated herein by reference.

EXAMPLE 13

Preparation of a Touch Sensor by Using a Transferable Conductive Nanocomposite.

In this example, preparation of a touch sensor by using a transferable conductive nanocomposite was disclosed. The process shown in FIG. 17 may be used.

Two fourth components 115, prepared in Example 12, may be used in the preparation of this exemplary touch sensor. In this example, the transparent substrate of one of the first fourth components may act as a cover lens 111 for the touch sensor 200.

The front surface of these components may be patterned by a process disclosed in Example 12. The patterning processes, shown in FIG. 17, 4A Patterning and 4B Patterning, may be same patterning process that provides the same pattern on the front surfaces of the two fourth components. Or, the patterning processes, shown in FIG. 17, 4A and 4B, may be different patterning processes that provide different pattern on the front surfaces of the two fourth components. Thus, a variety of different touch sensors with the different or same pattern may be prepared by such approaches. All such sensors are within the scope of this disclosure. This patterning may form a sixth component 121 and a seventh component 122.

The sixth component 121 and the seventh component 122 may be assembled by using an optically clear adhesive layer 123 to form an exemplary touch sensor 200 shown in FIG. 6 (4C Layering). A protective film 102 may be layered on the back surface of the touch sensor 200.2 to isolate the exposed surface of the second sensor layer from the environment.

EXAMPLE 14

Preparation of a Touch Sensor by Using a Transferable Conductive Nanocomposite

In this example, preparation of a touch sensor by using a transferable conductive nanocomposite was disclosed. The process shown in FIG. 18 may be used.

A fifth component 116, prepared in Example 12, may be used in the preparation of this exemplary touch sensor. The front surfaces of the first and the second electrically conductive nanocomposite layer may be patterned by a process disclosed in Example 12. The patterning process, shown in FIG. 18, 5A Patterning, may be same patterning process for both surfaces to provide same patterns on the front surfaces of the first and the second electrically conductive nanocomposite layers. Or, the patterning process, shown in FIG. 18, 5A Patterning, may be a different patterning process for each surface that provides different pattern on each front surface of the first and the second electrically conductive nanocomposite layers. Thus, a variety of different touch sensors with different or same patterns may be prepared by such approaches. All such sensors are within the scope of this disclosure. This patterning may form a twelfth component 130.

In a separate process, one of the surfaces of a cover lens 111 may be coated with an optically clear adhesive 123 to form a thirteenth component 131.

The twelfth component 130 and the thirteenth component 131 may be assembled by a layering process (5C Layering) to form an exemplary touch sensor 200 shown in FIG. 7. A protective film 102 may be layered on the back surface of the touch sensor 200.2 to isolate the exposed surface of the second sensor layer from the environment.

EXAMPLE 15

Siloxane Oligomer and Glass Surface Treatment

Figure 19:
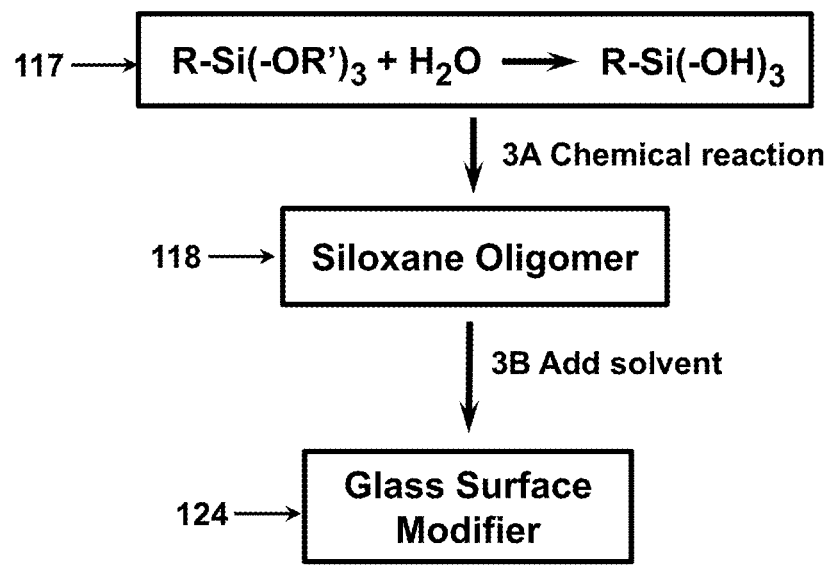
FIG. 19 is a flow diagram that illustrates method of production of an exemplary glass surface modifier.
Figure 20:
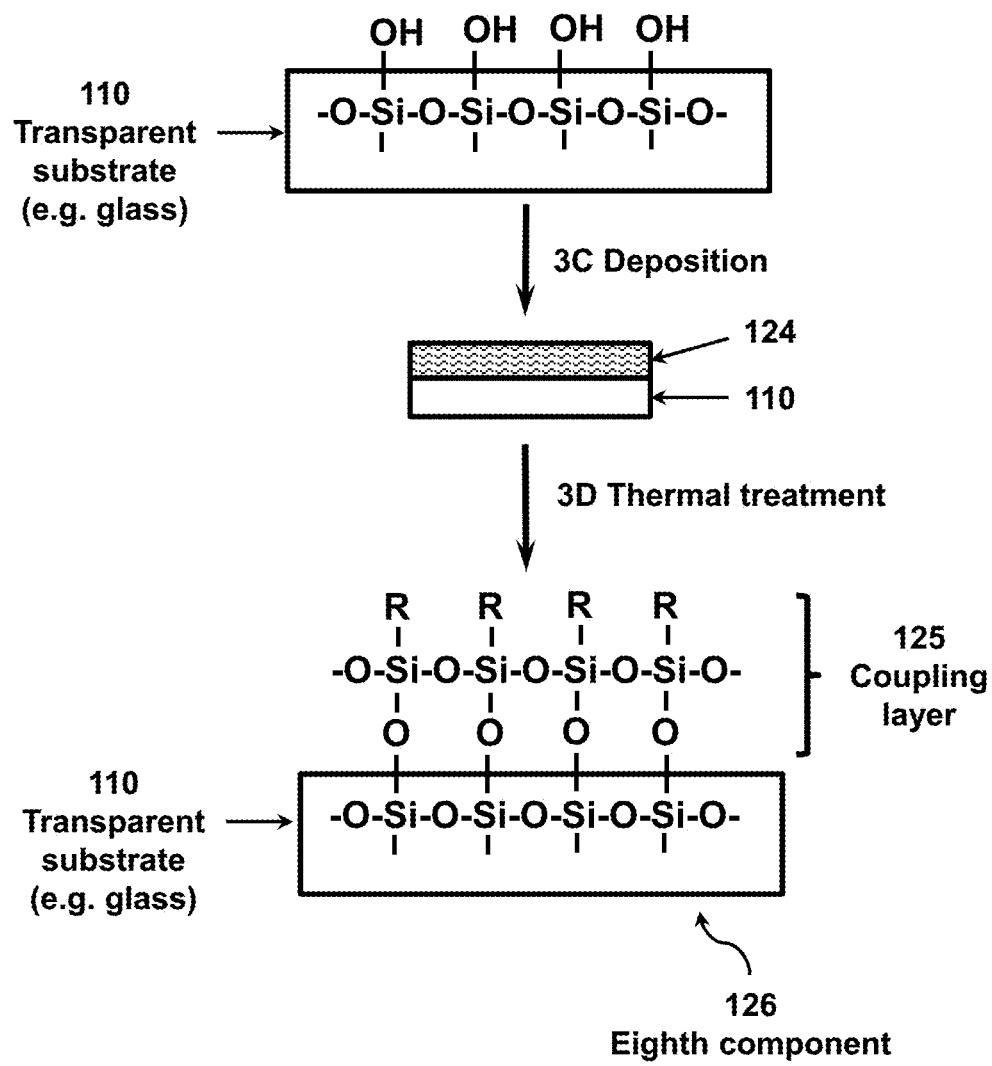
FIG. 20 is a flow diagram that illustrates method of formation of a coupling layer on a glass transparent substrate.

Referring to FIGS. 19-20, about 120 grams of aqueous solution of acetic acid (pH=4) was mixed with about 30 grams of OFS-6030 to form a reaction mixture 117 (3A Chemical reaction). The mixture was stirred at room temperature for about 100 hours. The mixture was separated into two phases at the end of the reaction. The lower phase was removed as a siloxane oligomer 118.

Then the siloxane oligomer 118 was dissolved in methanol and isopropanol mixture (about 1/3 ratio) to prepare about 0.05 wt % diluted solution of the siloxane oligomer (3B Add solvent). A glass surface modifier 124 was thereby prepared. A glass substrate 110 was then coated with the siloxane glass surface modifier 124 by using a spray coating process (3C Deposition) and then heated at about 100° C. for about 15 minutes (3D Thermal Treatment). A siloxane coupling layer 125 was formed on the surface of the glass sheet after the thermal treatment. An eighth component comprising the glass substrate 110 and a coupling layer 125 was thereby prepared.

EXAMPLE 16

Figure 21:
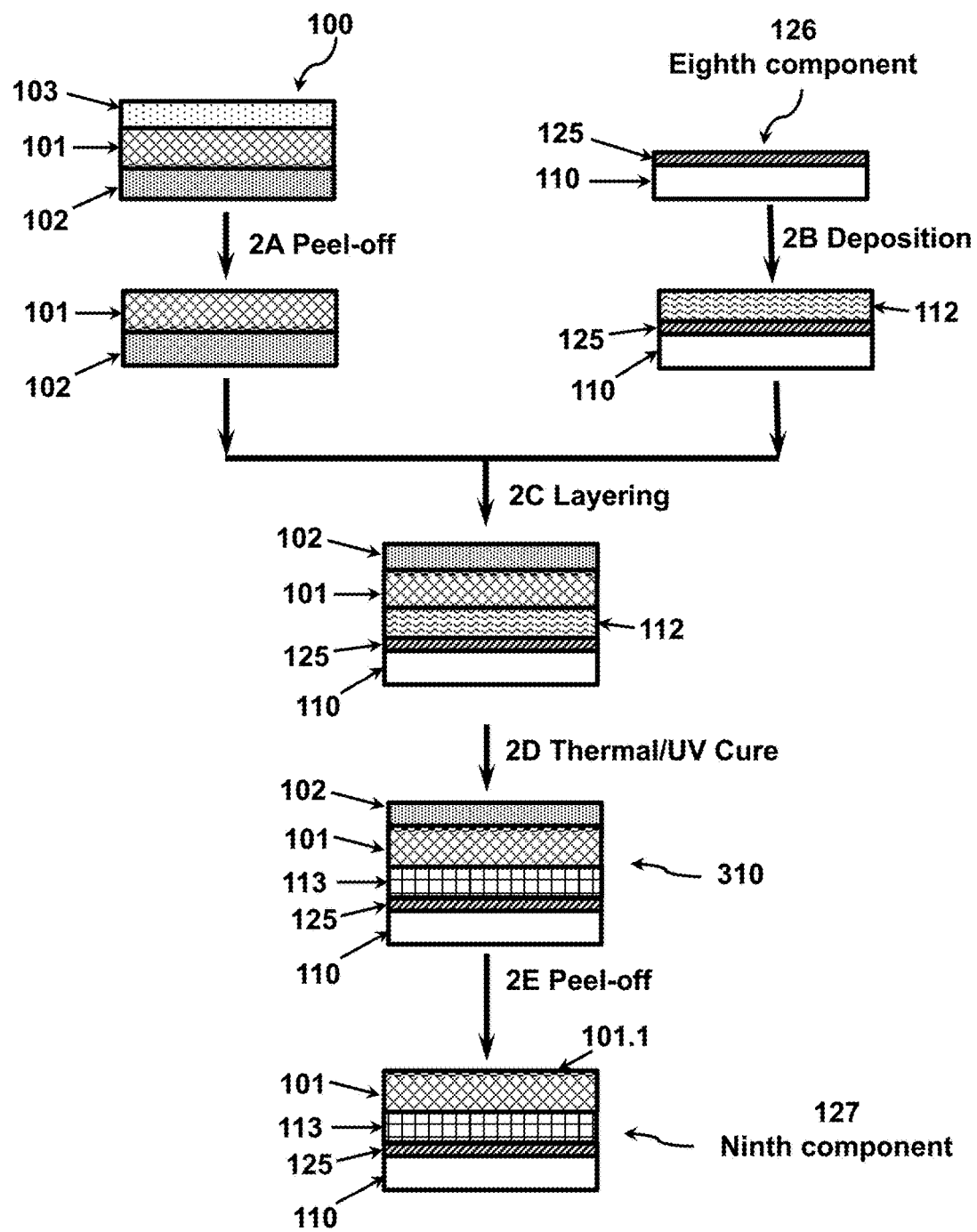
FIG. 21 is a drawing of an exemplary method of forming a single-sided transparent conductive electrode comprising a glass substrate.
Figure 22:
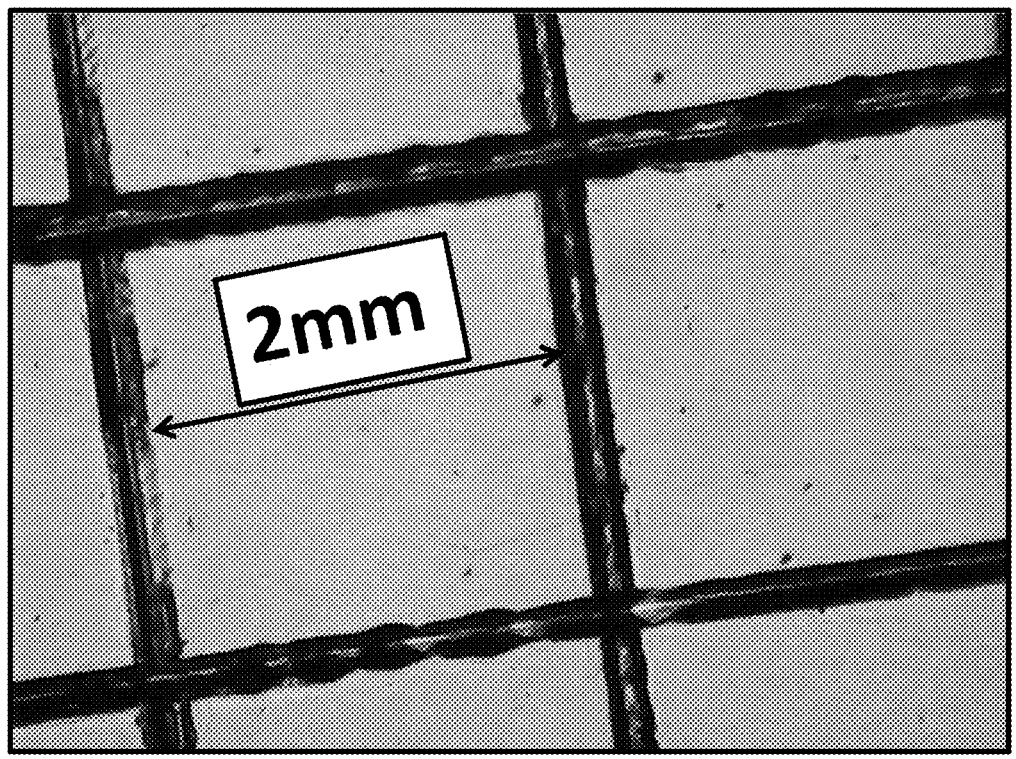
FIG. 22 is a photograph of a cross hatch adhesion test result. The test was carried out to determine adhesion of a transparent conductive layer formed on a glass sheet. The length the black arrow is about 2 millimeters.

Preparation of a Single-sided Transparent Conductive Electrode Comprising a Glass Substrate The process used in this example is schematically shown in FIG. 21. In this example, the transferable silver nanowire nanocomposite 100 prepared in Example 2 was used. First, the PET release film 103 was peeled off, as shown in FIG. 21, 2A Peel-off. The eighth component 126 comprising the glass substrate 110 and the siloxane coupling layer 125 prepared in Example 15 was coated with a liquid lamination formulation 112 comprising (a) monomers: SR 285, SR238, and SR351; and (b) catalysts: Irgacure 754 and Iganox 1010 (2B Deposition). A transferable conductive nanocomposite 100 was then placed on the liquid lamination layer with back surface 101.2 contacting with the liquid lamination layer (2C Layering). Excess amount of the liquid lamination formulation was driven off by applying the Meyer rod #0 on the drawdown machine. Then the component was moved to the UV conveyor system and cured at a belt speed of about 3 ft/min to obtain a single-sided transparent conductive glass sheet (2D Thermal/UV Cure). A single-sided transparent conductive electrode 310 comprising a protective film 102, the electrically conductive nanocomposite layer 101, the solid lamination layer 113, the siloxane coupling layer 125, and the glass substrate 110 was thereby prepared. The peeling-off of the protective films forms the ninth component 127. The ninth component was tested to determine adhesion of the transparent conductive layer to the glass substrate according to ASTM D3359. This component passed the adhesion 5B as shown in FIG. 22.

EXAMPLE 17

Figure 23:
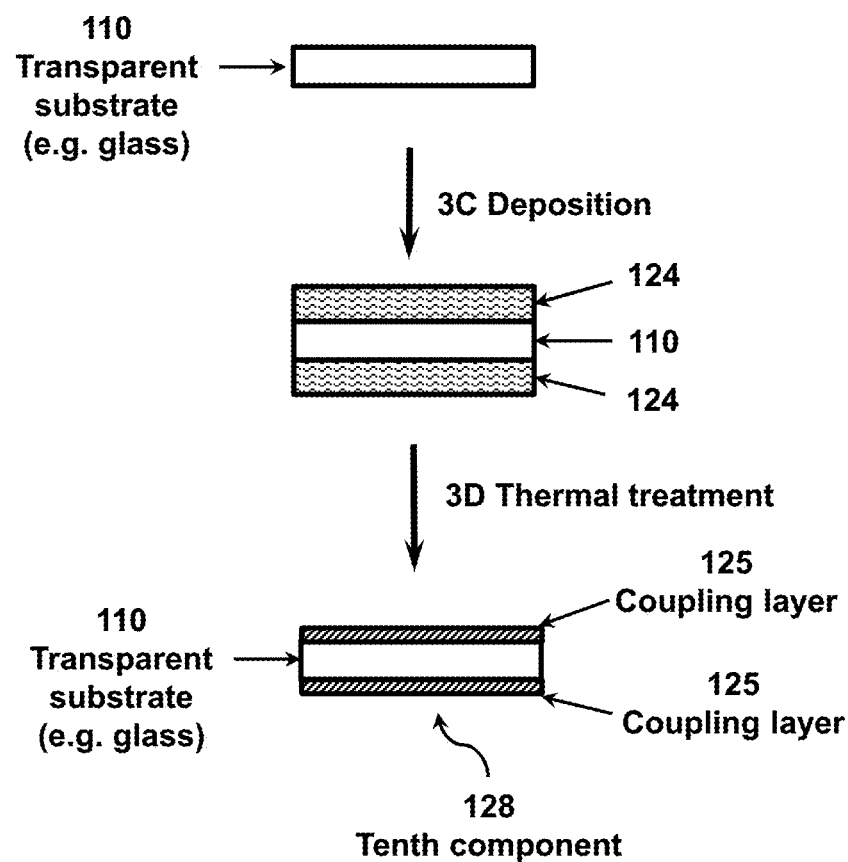
FIG. 23 is a drawing of an exemplary method of forming coupling layers on a front surface and a back surface of a glass substrate.

Double-sided Transparent Conductive Glass Sheet Made by Transferable Silver Nanocomposite A double-sided conductive glass sheet was prepared by following the process shown in FIG. 23. In this example, the transferable silver nanowire nanocomposite 100 prepared in Example 2 was used.

Referring to FIGS. 19 and 23, about 120 grams of aqueous solution of acetic acid (pH=4) was mixed with about 30 grams of OFS-6030 to form the reaction mixture 117. The mixture was stirred at room temperature for about 100 hours. The mixture was separated into two phases at the end of the reaction. The lower phase was removed as a siloxane oligomer 118.

Then the siloxane oligomer 118 was dissolved in methanol and isopropanol mixture (about 1/3 ratio ) to prepare about 0.05 wt % diluted solution of the siloxane oligomer. A glass surface modifier 124 was thereby prepared. A front and back surfaces of a glass substrate 110 was then coated with the siloxane glass surface modifier 124 by using a spray coating process (3C Deposition) and then heated at about 100° C. for about 15 minutes (3D Thermal treatment). Siloxane coupling layers 125 were formed on the front and the back surfaces of the glass sheet after the thermal treatment. A tenth component comprising the glass substrate 110 and two coupling layers 125 was thereby prepared, as shown in FIG. 23.

In this example, both the front and back surfaces of the tenth component 128 comprising the glass substrate 110 and the siloxane coupling layers 125 were coated with a liquid lamination formulation 112 comprising (a) monomers: SR 285, SR238, and SR351; and (b) catalysts: Irgacure 754 and Iganox 1010 (FIG. 24, 2B Deposition).

Figure 24:
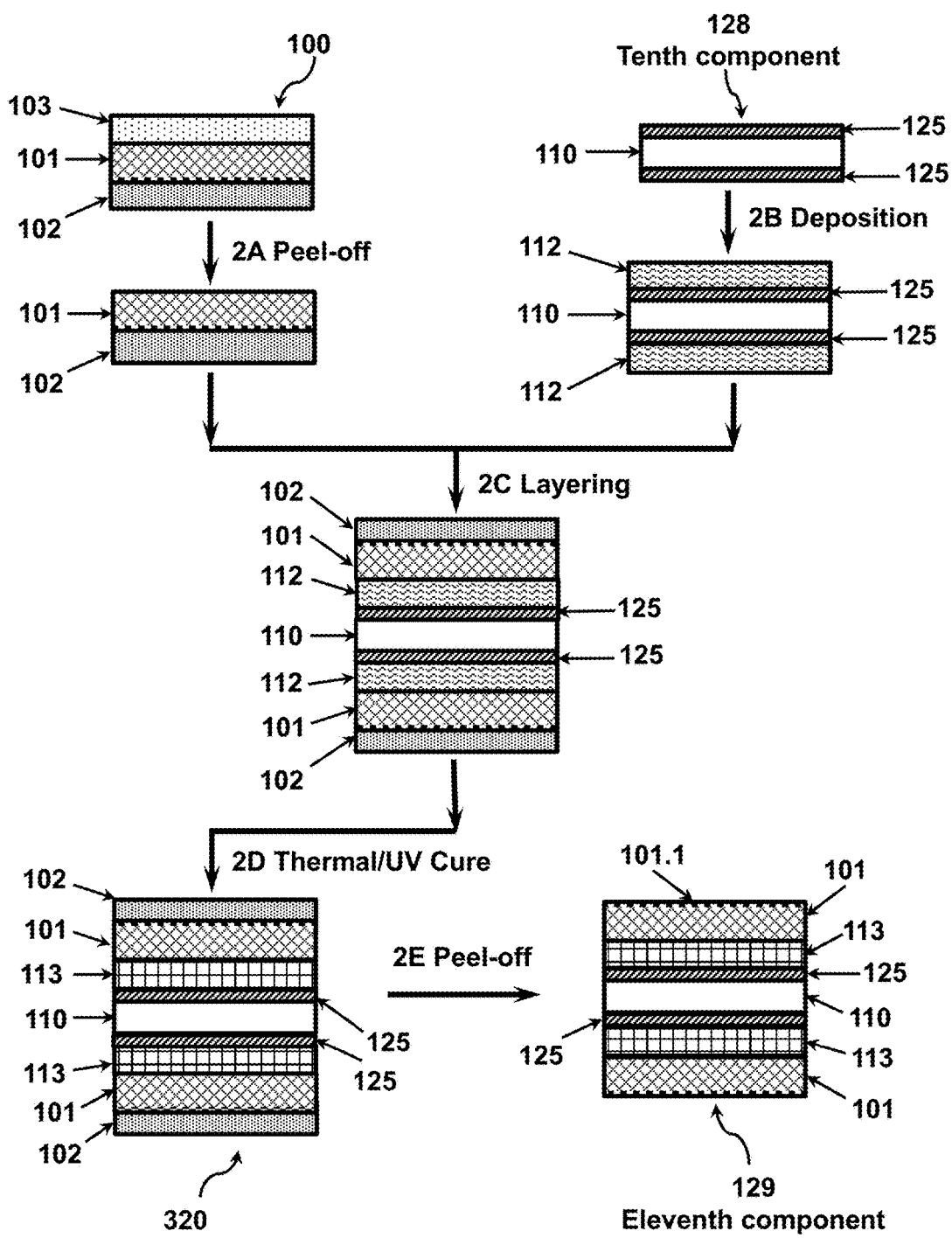
FIG. 24 is a drawing of an exemplary method of forming a double-sided transparent conductive electrode comprising a glass substrate.

Then, the PET release films 103 were peeled off from two transferable electrically conductive nanocomposites, as shown in FIG. 24-2A Peel off. (Only one of the two transferable electrically conductive nanocomposite is shown in this figure.)

The first transferable conductive nanocomposite 100 was then placed on the first liquid lamination layer with its back surface 101.2 contacting with the first liquid lamination layer. Similarly, the second transferable conductive nanocomposite 100 was then placed on the second liquid lamination layer with its back surface 101.2 contacting with the second liquid lamination layer. See FIG. 24, 2C Layering.

Excess amount of the liquid lamination formulation was driven off by applying the Meyer rod #0 on the drawdown machine. Then the component was moved to the UV conveyor system and cured at a belt speed of about 3 ft/min to obtain a double-sided transparent conductive glass sheet (2D Thermal/UV Cure). A double-sided transparent conductive electrode 320 comprising a first protective film 102, the first electrically conductive nanocomposite layer 101, the first solid lamination layer 113, the first siloxane coupling layer 125, the glass substrate 110, the second siloxane coupling layer 125, the second solid lamination layer 113, the second electrically conductive nanocomposite layer 101, and the second protective film 102 was thereby prepared.

The first and the second protective films may be peeled off from the touch sensor to expose the front surfaces of the first and the second electrically conductive nanocomposites for a patterning process. This process thereby forms the eleventh component 129. This component may be used in the manufacturing a touch sensor comprising a glass substrate. The front and the back surfaces of the eleventh component may be patterned by a process disclosed above.

Any combination of above features, systems, devices, and methods are within the scope of this disclosure.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A transferable electrically conductive nanocomposite comprising:
    an electrically conductive nanocomposite layer; and
    a protective film;
    wherein the electrically conductive nanocomposite layer, and the protective film each have a front surface and a back surface;

wherein the front surface of the electrically conductive nanocomposite layer faces the back surface of the protective film;

wherein the electrically conductive nanocomposite layer comprises an electrically conductive nanomaterial and a polymer; and wherein concentration of the electrically conductive nanomaterial at or around the front surface of the electrically conductive nanocomposite layer is higher than concentration of the electrically conductive nanomaterial at or around the back surface of the electrically conductive nanocomposite layer.

2. The transferable electrically conductive nanocomposite of claim 1, further comprising a release film;

wherein the release film has a front surface and a back surface;

wherein the back surface of the electrically conductive nanocomposite layer faces the release film;

wherein the release film adheres to the back surface of the electrically conductive nanocomposite layer and the protective film adheres to the front surface of the electrically conductive nanocomposite layer; and wherein force of adhesion between the protective film and the front surface of the electrically conductive nanocomposite layer is higher than force of adhesion between the release film and the back surface of the electrically conductive nanocomposite layer.

3. The transferable electrically conductive nanocomposite of claim 1, further comprising a release film;

wherein the release film has a front surface and a back surface;

wherein the back surface of the electrically conductive nanocomposite layer faces the release film;

wherein the release film adheres to the back surface of the electrically conductive nanocomposite layer and the protective film adheres to the front surface of the electrically conductive nanocomposite layer; and wherein force of adhesion between the electrically conductive nanocomposite layer and the release film, and force of adhesion between the electrically conductive nanocomposite layer and the protective film are configured such that when the release film is peeled off from the back surface of the electrically conductive nanocomposite layer, the protective film remains adhered to the front surface of the electrically conductive nanocomposite layer.

4. The transferable electrically conductive nanocomposite of claim 1, wherein the electrically conductive nanomaterial comprises a nanowire, a nanoribbon, a nanotube, a nanoparticle, or any combination thereof; and wherein the polymer of the electrically conductive nanocomposite layer comprises a polyacrylate, a polymethacrylate, a polyurethane acrylate, a polyisocyanurate acrylate, a polyepoxide, or any combination thereof.

5. The transferable electrically conductive nanocomposite of claim 1, wherein the electrically conductive nanomaterial comprises a silver nanowire, a copper nanowire, a gold nanowire, a stainless steel nanowire, or any combination thereof; and wherein the polymer of the electrically conductive nanocomposite layer comprises a polyacrylate, a polymethacrylate, a polyurethane acrylate, a polyisocyanurate acrylate, a polyepoxide, or any combination thereof.

6. The transferable electrically conductive nanocomposite of claim 1, wherein the protective film and/or the release film comprises poly(ethylene terephthalate) (PET), poly(methyl methacrylate) (PMMA), polycarbonate (PC), poly(ethylene naphthalate) (PEN), cellulose triacetate (TAC), polyimide (PI), or any combination thereof.

7. A transparent conductive electrode comprising:

an electrically conductive nanocomposite layer;

a lamination layer; and a transparent substrate;

wherein the electrically conductive nanocomposite layer, the lamination layer, and the transparent substrate each have a front surface and a back surface;

wherein the front surface of the lamination layer faces the back surface of the electrically conductive nanocomposite layer;

wherein the front surface of the transparent substrate faces the back surface of the lamination layer;

wherein the lamination layer is between the electrically conductive nanocomposite layer and the transparent substrate;

wherein the electrically conductive nanocomposite layer comprises an electrically conductive nanomaterial and a polymer; and wherein concentration of the electrically conductive nanomaterial at or around the front surface of the electrically conductive nanocomposite layer is higher than concentration of the electrically conductive nanomaterial at or around the back surface of the electrically conductive nanocomposite layer.

8. The transparent conductive electrode of claim 7, further comprising a protective film; wherein the protective film has a front surface and a back surface; and wherein the back surface of the protective film faces the front surface of the electrically conductive nanocomposite layer.

9. The transparent conductive electrode of claim 8, wherein the protective film comprises PET, PMMA, PC, PEN, TAC, PI, or any combination thereof;

wherein the transparent substrate comprises PMMA, PC, a glass, or any combination thereof; and wherein the lamination layer comprises a polyacrylate, a polymethacrylate, a polyurethane acrylate, a polyisocyanurate acrylate, a polyepoxide, or any combination thereof.

10. The transparent conductive electrode of claim 7, wherein the electrically conductive nanomaterial comprises a nanowire, a nanoribbon, a nanotube, a nanoparticle, or any combination thereof; and wherein the polymer of the electrically conductive nanocomposite layer comprises a polyacrylate, a polymethacrylate, a polyurethane acrylate, a polyisocyanurate acrylate, a polyepoxide, or any combination thereof.

11. The transparent conductive electrode of claim 7, wherein the electrically conductive nanomaterial comprises a silver nanowire, a copper nanowire, a gold nanowire, a stainless steel nanowire, or any combination thereof; and wherein the polymer of the electrically conductive nanocomposite layer comprises a polyacrylate, a polymethacrylate, a polyurethane acrylate, a polyisocyanurate acrylate, a polyepoxide, or any combination thereof.

12. The transparent conductive electrode of claim 7, further comprising:

a second electrically conductive nanocomposite layer; and a second lamination layer; and wherein the electrically conductive nanocomposite layer of claim 8 is a first electrically conductive nanocomposite layer;

wherein the lamination layer of claim 8 is a first lamination layer;
wherein the second lamination layer and the second electrically conductive nanocomposite layer each have a front surface and a back surface;
wherein the front surface of the second lamination layer faces the back surface of the transparent substrate;
wherein the back surface of the second electrically conductive nanocomposite layer faces the back surface of the second lamination layer;
wherein the second lamination layer is between the transparent substrate and the second conductive nanocomposite layer; and
wherein the second electrically conductive nanocomposite layer comprises an electrically conductive nanomaterial and a polymer.

13. The transparent conductive electrode of claim 12, further comprising a first protective film;
wherein the first protective film has a front surface and a back surface;
wherein the back surface of the first protective film faces the front surface of the first electrically conductive nanocomposite layer; and
wherein the first protective film comprises PET, PMMA, PC, PEN, TAC, PI, or any combination thereof.

14. The transparent conductive electrode of claim 12, further comprising a second protective film;
wherein the second protective film has a front surface and a back surface;
wherein the back surface of the second protective film faces the front surface of the second electrically conductive nanocomposite layer; and
wherein the second protective film comprises PET, PMMA, PC, PEN, TAC, PI, or any combination thereof.

15. The transparent conductive electrode of claim 12, wherein concentration of the electrically conductive nanomaterial layer at or around the front surface of the second electrically conductive nanocomposite layer is higher than concentration of the electrically conductive nanomaterial at or around the back surface of the second electrically conductive nanocomposite layer.

16. The transparent conductive electrode of claim 12, wherein the electrically conductive nanomaterial of the first electrically conductive nanocomposite layer and/or the electrically conductive nanomaterial of the second electrically conductive nanocomposite layer each comprise(s) a nanowire, a nanoribbon, a nanotube, a nanoparticle, or any combination thereof.

17. The transparent conductive electrode of claim 12, wherein the electrically conductive nanomaterial of the first electrically conductive nanocomposite layer and/or the electrically conductive nanomaterial of the second electrically conductive nanocomposite layer each comprise(s) a silver nanowire, a copper nanowire, a gold nanowire, a stainless steel nanowire, or any combination thereof.

18. The transparent conductive electrode of claim 12, wherein the polymer of the first electrically conductive nanocomposite layer and/or the polymer of the second electrically conductive nanocomposite layer comprise(s) a polyacrylate, a polymethacrylate, a polyurethane acrylate, a polyisocyanurate acrylate, a polyepoxide, or any combination thereof.

19. A system comprising:
a cover lens;
a first lamination layer;
a first sensor layer;
an optically clear adhesive layer;
a transparent substrate;
a second lamination layer; and
a second sensor layer;
wherein the cover lens, the first lamination layer, the first sensor layer, the optically clear adhesive layer, the transparent substrate, the second lamination layer, and the second sensor layer each have a front surface and a back surface;
wherein the first lamination layer is between the cover lens and the first sensor layer;
wherein the optically clear adhesive layer is between the first sensor layer and the transparent substrate;
wherein the second lamination layer is between the transparent substrate and the second sensor layer;
wherein the cover lens is formed on the front surface of the first lamination layer;
wherein the first lamination layer is formed on the front surface of the first sensor layer;
wherein the first sensor layer is formed on the front surface of the optically clear adhesive layer;
wherein the optically clear adhesive layer is formed on the front surface of the transparent substrate;
wherein the transparent substrate is formed on the front surface of the second lamination layer; and
wherein the second lamination layer is formed on the front surface of the second sensor layer.

20. The system of claim 19, wherein the first sensor layer and/or the second sensor layer each comprise(s) a pattern such that the system can detect a touch.

21. The system of claim 19, wherein the first sensor layer and/or the second sensor layer each comprise(s) an electrically conductive nanomaterial and a polymer.

22. The system of claim 21, wherein concentration of the electrically conductive nanomaterial at or around the front surface of the first sensor layer is higher than concentration of the electrically conductive nanomaterial at or around the back surface of the first sensor layer.

23. The system of claim 21, wherein concentration of the electrically conductive nanomaterial at or around the front surface of the second sensor layer is higher than concentration of the electrically conductive nanomaterial at or around the back surface of the second sensor layer.

24. The system of claim 21, wherein the electrically conductive nanomaterial comprises a nanowire, a nanoribbon, a nanotube, a nanoparticle, or any combination thereof.

25. The system of claim 21, wherein the electrically conductive nanomaterial comprises a silver nanowire, a copper nanowire, a gold nanowire, a stainless steel nanowire, or any combination thereof.

26. The system of claim 21, wherein the polymer of the first sensor layer and/or the polymer of the second layer each comprise(s) a polyacrylate, a polymethacrylate, a polyurethane acrylate, a polyisocyanurate acrylate, a polyepoxide, or any combination thereof.

27. The system of claim 20, wherein the pattern of the first sensor layer and/or the pattern of the second sensor layer each form(s) a touch sensor.

28. The system of claim 27, wherein the system is a display system comprising the touch sensor.

29. The system of claim 28, wherein the display system is a liquid crystal display, a light emitting display, a light emitting organic display, a plasma display, an electrochromic display, an electrophoretic display, an electrowetting display, an electrofluidic display, or any combination thereof.

30. A system comprising:
a cover lens;
an optically clear adhesive layer;
a first sensor layer;
a first lamination layer;
a transparent substrate;
a second lamination layer; and
a second sensor layer;
wherein the cover lens, the optically clear adhesive layer, the first sensor layer, the first lamination layer, the transparent substrate, the second lamination layer, and the second sensor layer each have a front surface and a back surface;
wherein the optically clear adhesive layer is between the cover lens and the first sensor layer;
wherein the first lamination layer is between the first sensor layer and the transparent substrate;
wherein the second lamination layer is between the transparent substrate and the second sensor layer;
wherein the cover lens is formed on the front surface of the optically clear adhesive layer;
wherein the optically clear adhesive layer is formed on the front surface of the first sensor layer;
wherein the first sensor layer is formed on the front surface of the first lamination layer;
wherein the first lamination layer is formed on the front surface of the transparent substrate;
wherein the transparent substrate is formed on the front surface of the second lamination layer; and
wherein the second lamination layer is formed on the front surface of the second sensor layer.

31. The system of claim 30, wherein the first sensor layer and/or the second sensor layer each comprise(s) a pattern such that the system can detect a touch.

32. The system of claim 30, wherein the first sensor layer and/or the second sensor layer each comprise(s) an electrically conductive nanomaterial and a polymer.

33. The system of claim 31, wherein concentration of the electrically conductive nanomaterial at or around the front surface of the first sensor layer is higher than concentration of the electrically conductive nanomaterial at or around the back surface of the first sensor layer.

34. The system of claim 31, wherein concentration of the electrically conductive nanomaterial at or around the front surface of the second sensor layer is higher than concentration of the electrically conductive nanomaterial at or around the back surface of the second sensor layer.

35. The system of claim 31, wherein the electrically conductive nanomaterial comprises a nanowire, a nanoribbon, a nanotube, a nanoparticle, or any combination thereof.

36. The system of claim 31, the electrically conductive nanomaterial comprises a silver nanowire, a copper nanowire, a gold nanowire, a stainless steel nanowire, or any combination thereof.

37. The system of claim 36, wherein the polymer of the first sensor layer and/or the second layer each comprise(s) a polyacrylate, a polymethacrylate, a polyurethane acrylate, a polyisocyanurate acrylate, a polyepoxide, or any combination thereof.

38. The system of claim 31, wherein the pattern of the first sensor layer and/or pattern of the second sensor layer each form(s) a touch sensor.

39. The system of claim 38, wherein the system is a display system comprising the touch sensor.

40. The system of claim 39, wherein the display system is a liquid crystal display, a light emitting display, a light emitting organic display, a plasma display, an electrochromic display, an electrophoretic display, an electrowetting display, an electrofluidic display, or any combination thereof.

41. A transparent conductive electrode comprising:
an electrically conductive nanocomposite layer;
a lamination layer;
a coupling layer; and
a transparent substrate;
wherein the electrically conductive nanocomposite layer, the lamination layer, the coupling layer, and the transparent substrate each have a front surface and a back surface;
wherein the front surface of the lamination layer faces the back surface of the electrically conductive nanocomposite layer;
wherein the front surface of the coupling layer faces the back surface of the lamination layer;
wherein the front surface of the transparent substrate faces the back surface of the coupling layer;
wherein the lamination layer is between the conductive nanocomposite layer and the coupling layer;
wherein the coupling layer is between the transparent substrate and the lamination layer; and
wherein the electrically conductive nanocomposite layer comprises an electrically conductive nanomaterial and a polymer.

42. The transparent conductive electrode of claim 41, further comprising a first protective film; wherein the first protective film has a front surface and a back surface; and wherein the back surface of the first protective film faces the front surface of the first electrically conductive nanocomposite layer.

43. The transparent conductive electrode of claim 42, wherein the first protective film comprises PET, PMMA, PC, PEN, TAC, PI, or any combination thereof.

44. The transparent conductive electrode of claim 41, wherein the transparent substrate comprises PMMA, PC, a glass, or any combination thereof.

45. The transparent conductive electrode of claim 41, wherein the transparent substrate comprises a glass.

46. The transparent conductive electrode of claim 41, wherein the first lamination layer comprises a polyacrylate, a polymethacrylate, a polyurethane acrylate, a polyisocyanurate acrylate, a polyepoxide, or any combination thereof.

47. The transparent conductive electrode of claim 41, wherein concentration of the electrically conductive nanomaterial at or around the front surface of the electrically conductive nanocomposite layer is higher than concentration of the electrically conductive nanomaterial at or around the back surface of the electrically conductive nanocomposite layer.

48. The transparent conductive electrode of claim 41, wherein the electrically conductive nanomaterial comprises a nanowire, a nanoribbon, a nanotube, a nanoparticle, or any combination thereof.

49. The transparent conductive electrode of claim 41, wherein the electrically conductive nanomaterial comprises a silver nanowire, a copper nanowire, a gold nanowire, a stainless steel nanowire, or any combination thereof.

50. The transparent conductive electrode of claim 41, wherein the polymer of the electrically conductive nanocomposite layer comprises a polyacrylate, a polymethacrylate, a polyurethane acrylate, a polyisocyanurate acrylate, a polyepoxide, or any combination thereof.

51. The transparent conductive electrode of claim 41, further comprising:
a second coupling layer;

a second lamination layer; and a second electrically conductive nanocomposite layer;

wherein the electrically conductive nanocomposite layer of claim 43 is the first electrically conductive nanocomposite layer;

wherein the second lamination layer of claim 43 is the first lamination layer;

wherein the second coupling layer of claim 43 is the first coupling layer;

wherein the second coupling layer, the second lamination layer, and the second electrically conductive nanocomposite layer each have a front surface and a back surface;

wherein the front surface of the second coupling layer faces the back surface of the transparent substrate;

wherein the front surface of the second lamination layer faces the back surface of the second coupling layer;

wherein the back surface of the second electrically conductive nanocomposite layer faces the back surface of the second lamination layer;

wherein the second coupling layer is between the transparent substrate and the second lamination layer;

wherein the second lamination layer is between the second coupling layer and the second electrically conductive nanocomposite layer; and wherein the second electrically conductive nanocomposite layer comprises an electrically conductive nanomaterial and a polymer.

52. The transparent conductive electrode of claim 51, further comprising a first protective film; wherein the first protective film has a front surface and a back surface; and wherein the back surface of the first protective film faces the front surface of the first electrically conductive nanocomposite layer.

53. The transparent conductive electrode of claim 52, wherein the first protective film comprises PET, PMMA, PC, PEN, TAC, PI, or any combination thereof.

54. The transparent conductive electrode of claim 51, wherein concentration of the electrically conductive nanomaterial layer at or around the front surface of the first electrically conductive nanocomposite layer is higher than concentration of the electrically conductive nanomaterial at or around the back surface of the first electrically conductive nanocomposite layer.

55. The transparent conductive electrode of claim 51, wherein concentration of the electrically conductive nanomaterial layer at or around the front surface of the second electrically conductive nanocomposite layer is higher than concentration of the electrically conductive nanomaterial at or around the back surface of the second electrically conductive nanocomposite layer.

56. The transparent conductive electrode of claim 51, wherein the electrically conductive nanomaterial of the first electrically conductive nanomaterial layer and/or the electrically conductive nanomaterial of the second electrically conductive nanomaterial layer each comprise(s) a nanowire, a nanoribbon, a nanotube, a nanoparticle, or any combination thereof.

57. The transparent conductive electrode of claim 51, wherein the electrically conductive nanomaterial of the first electrically conductive nanomaterial layer and/or the electrically conductive nanomaterial of the second electrically conductive nanomaterial layer each comprise(s) a silver nanowire, a copper nanowire, a gold nanowire, a stainless steel nanowire, or any combination thereof.

58. The transparent conductive electrode of claim 51, wherein the polymer of the second electrically conductive nanocomposite layer comprises a polyacrylate, a polymethacrylate, a polyurethane acrylate, a polyisocyanurate acrylate, a polyepoxide, or any combination thereof.

59. The transparent conductive electrode of claim 51, further comprising a second protective film; wherein the second protective film has a front surface and a back surface; and wherein the back surface of the second protective film faces the front surface of the second electrically conductive nanocomposite layer.

60. The transparent conductive electrode of claim 59, wherein the second protective film comprises PET, PMMA, PC, PEN, TAC, PI, or any combination thereof.

61. The transparent conductive electrode of claim 51, wherein the first coupling layer is formed by using a siloxane oligomer.

62. The transparent conductive electrode of claim 61, wherein the siloxane oligomer is prepared by hydrolysis of a trialkoxysilane; wherein:
trialkoxysilane has a general chemical formula $F—R^1—Si(OR^2)_3$;
F is a UV or a thermally curable functional group comprising an acryloxy, a methacryloxy, or an epoxy group;
$R^1$ is $C_3$ to $C_{20}$ alkylene group; and
$R^2$ is a $C_1$ to $C_5$ alkyl group.

63. The transparent conductive electrode of claim 62, wherein the trialkoxysilane is methacryloxy propyltrimethoxysilane.

64. The transparent conductive electrode of claim 51, wherein the first coupling layer and the second coupling layer are formed by using a siloxane oligomer.

65. The transparent conductive electrode of claim 64, wherein the siloxane oligomer is prepared by hydrolysis of a trialkoxysilane; wherein:
trialkoxysilane has a general chemical formula $F—R^1—Si(OR^2)_3$;
F is a UV or a thermally curable functional group comprising an acryloxy, a methacryloxy, or an epoxy group;
$R^1$ is $C_3$ to $C_{20}$ alkylene group; and
$R^2$ is a $C_1$ to $C_5$ alkyl group.

66. The transparent conductive electrode of claim 65, wherein the trialkoxysilane is methacryloxy propyltrimethoxysilane.

* * * * *